United States Patent [19]
Anderson et al.

[11] 3,956,883
[45] May 18, 1976

[54] SMOOTH AND HIGHLY RESPONSIVE GAS TURBINE TEMPERATURE LIMIT CONTROL ESPECIALLY USEFUL IN COMBINED CYCLE ELECTRIC POWER PLANTS

[75] Inventors: Joel M. Anderson, Ypsilanti, Mich.; Kermit R. Wescott, Wilmington, Del.; Milton M. Hobbs; Roy W. Kiscaden, both of Springfield, Pa.

[73] Assignee: Westinghouse Electric Corporation, Pittsburgh, Pa.

[22] Filed: Aug. 8, 1974

(Under Rule 47)

[21] Appl. No.: 495,725

[52] U.S. Cl. .......................... 60/39.14; 60/39.18 B; 60/39.28 R; 235/150.21; 290/40 R
[51] Int. Cl.² .................................................. F02C 7/26
[58] Field of Search ............... 60/39.28 R, 39.28 T, 60/39.14, 39.18; 290/40 R, 40 C; 235/150.21

[56] References Cited
UNITED STATES PATENTS

| | | | |
|---|---|---|---|
| 2,971,337 | 2/1961 | Wintrode | 60/39.28 R |
| 3,283,499 | 11/1966 | Scheidler | 60/39.28 R |
| 3,421,317 | 1/1969 | Bedford | 60/39.28 R |
| 3,469,395 | 9/1969 | Spitsbergen | 60/39.28 R |
| 3,758,764 | 9/1973 | Harner | 60/39.28 R |
| 3,854,287 | 12/1974 | Rembold | 60/39.28 T |

*Primary Examiner*—Clarence R. Gordon
*Attorney, Agent, or Firm*—E. F. Possessky

[57] ABSTRACT

A combined cycle electric power plant includes gas and steam turbines and steam generators and a digital-/analog control system. An automatic digital portion of the control system functions with temperature and other detectors to provide temperature limit control for the gas turbines through the fuel valve position controls provided therefor. A blade path temperature reference is generated as a function of combustor shell pressure during the startup and load modes of operation, and during the load mode of operation the blade path temperature reference is further generated with dependence on the actual turbine exhaust temperature. In particular, the turbine blade path temperature is allowed to rise under loading operation until it reaches a limit value defined by a predetermined combustor shell pressure characteristic curve. Thereafter, the blade path temperature reference is permitted to rise to a higher and final limit value which exists when the actual exhaust temperature equals a limit temperature value defined by another combustor shell pressure characteristic curve which is higher than the first curve.

34 Claims, 38 Drawing Figures

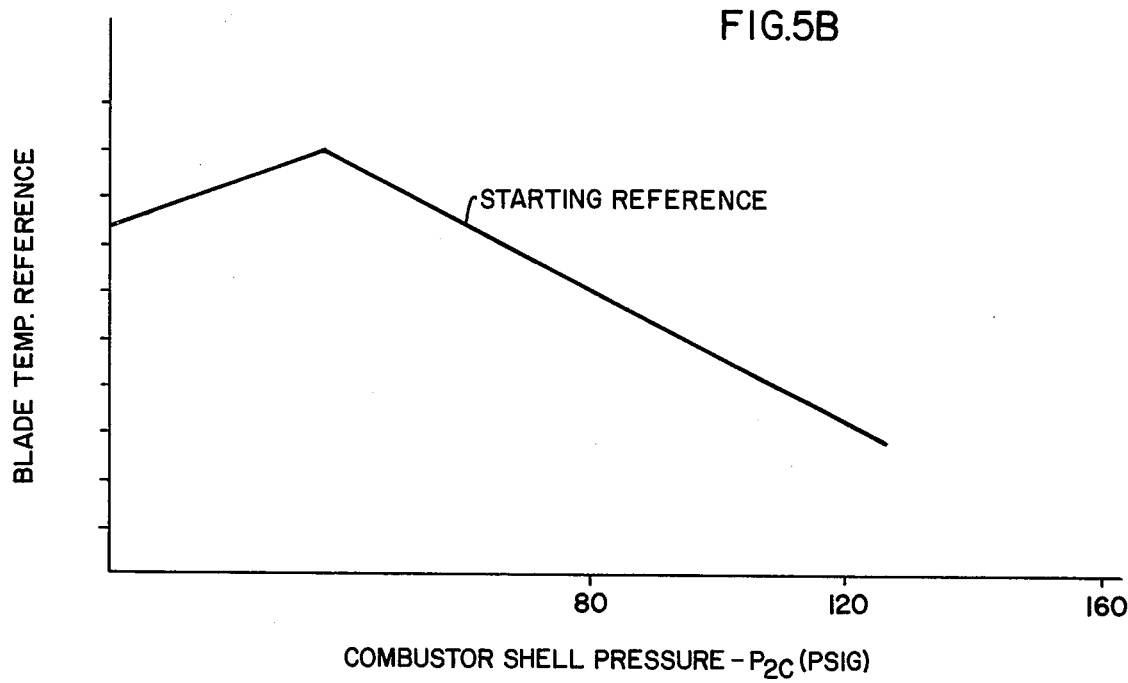
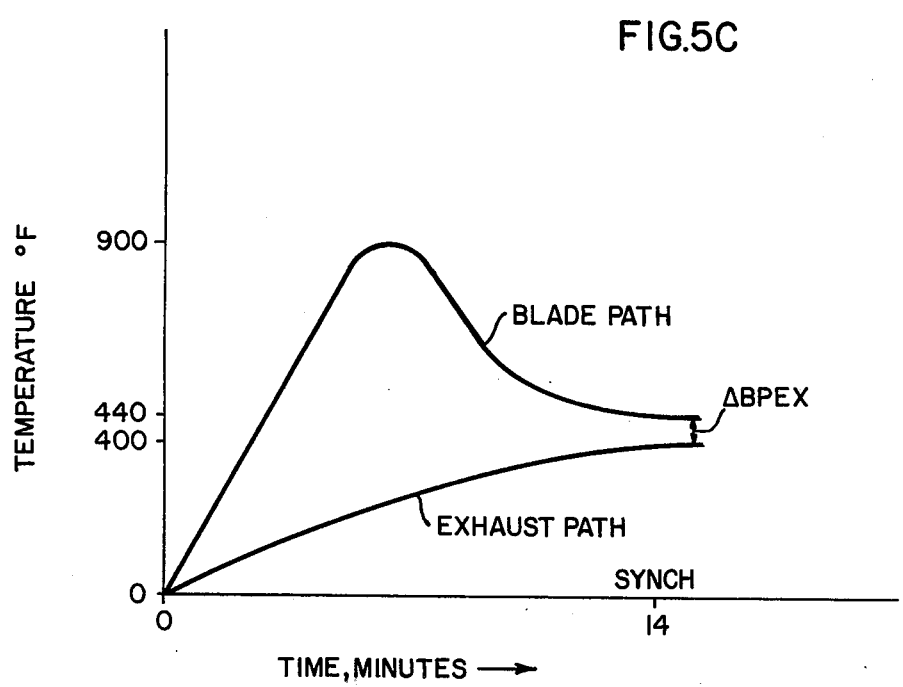

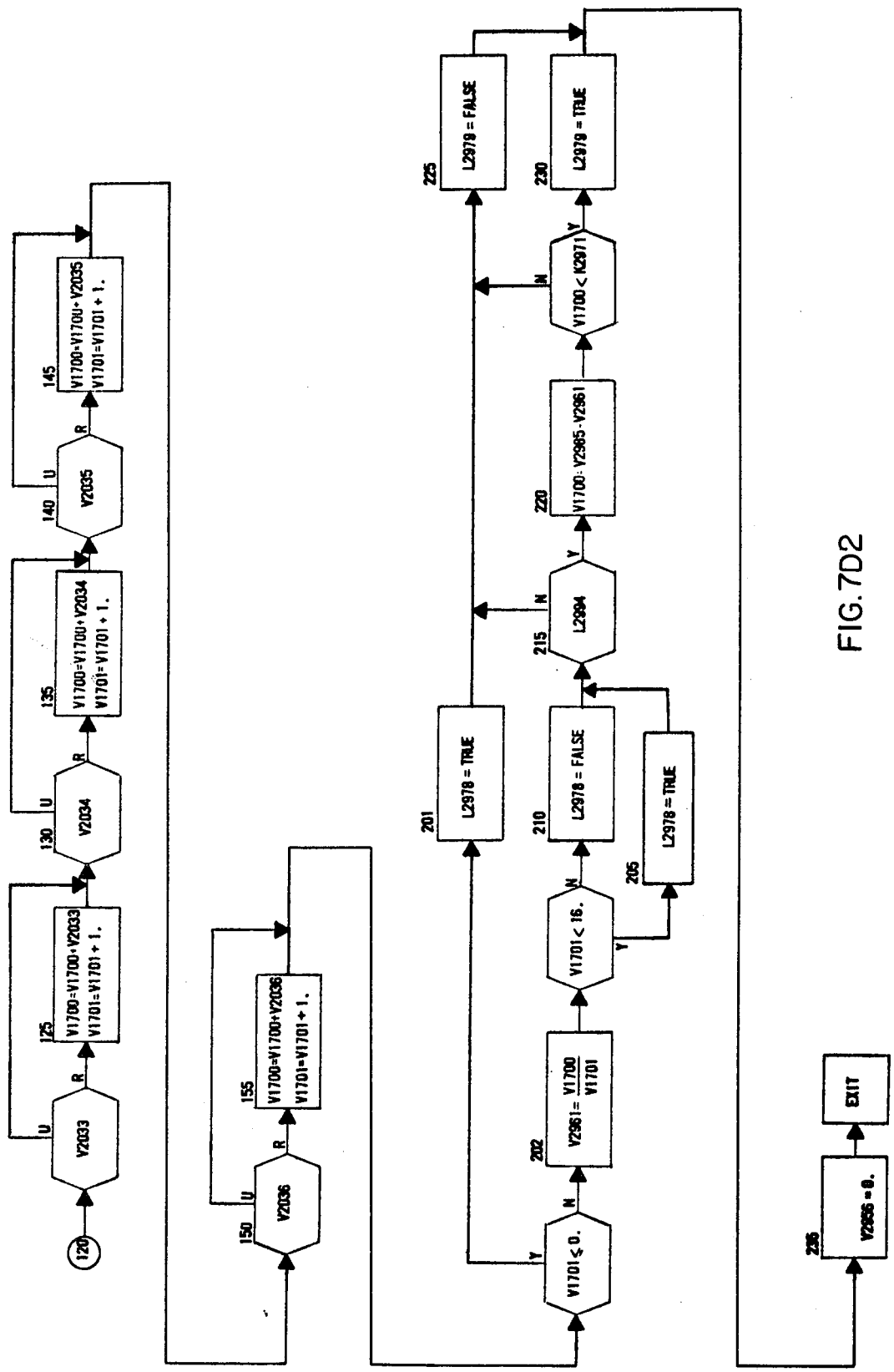
FIG.7D2

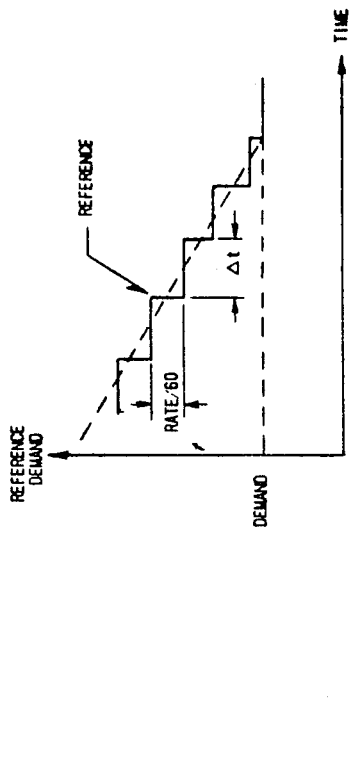
FIG. 7F1
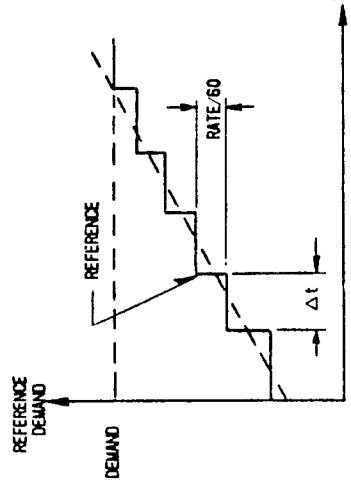
FIG. 7F2
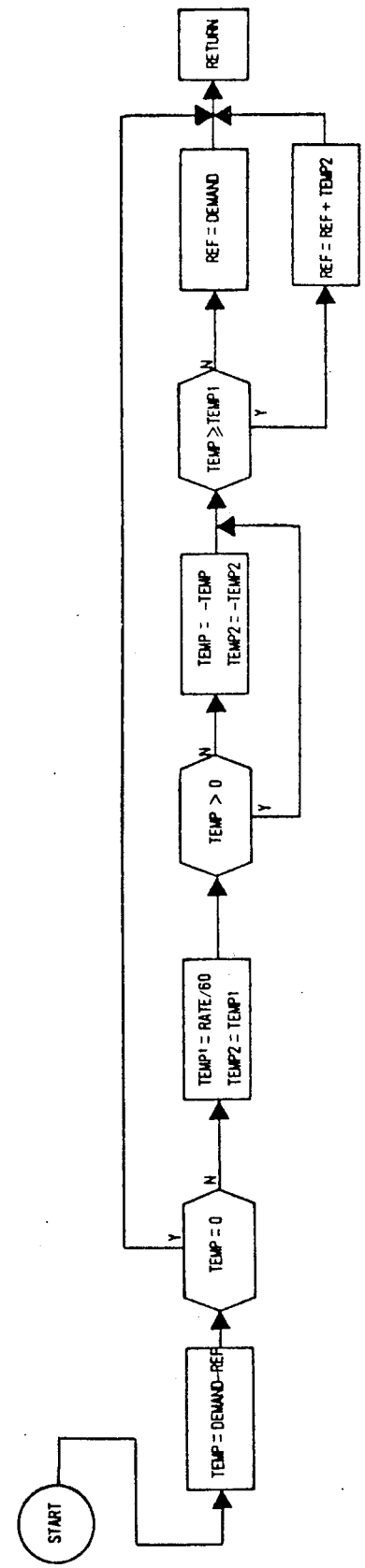
FIG. 7F3

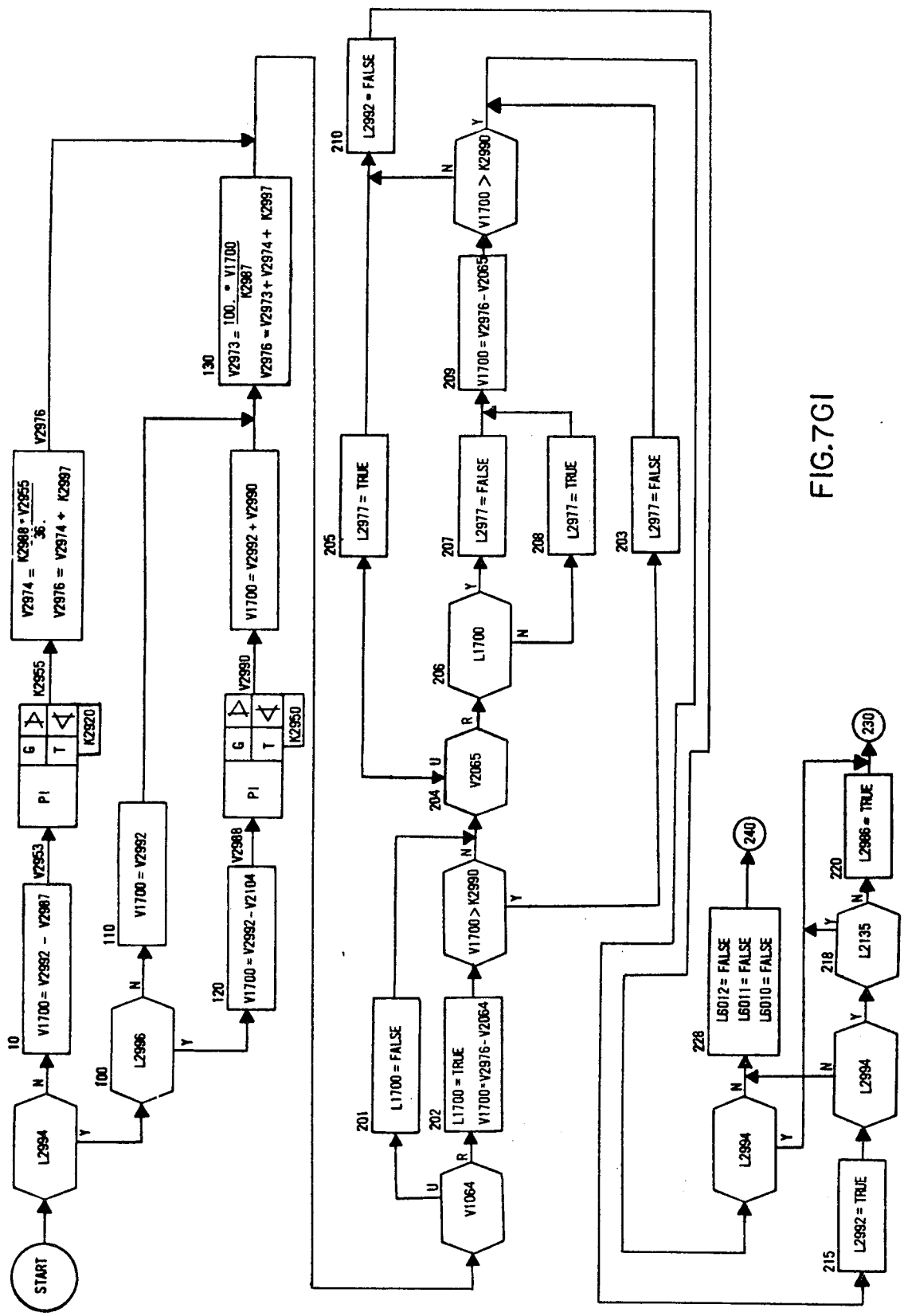
FIG.7G1

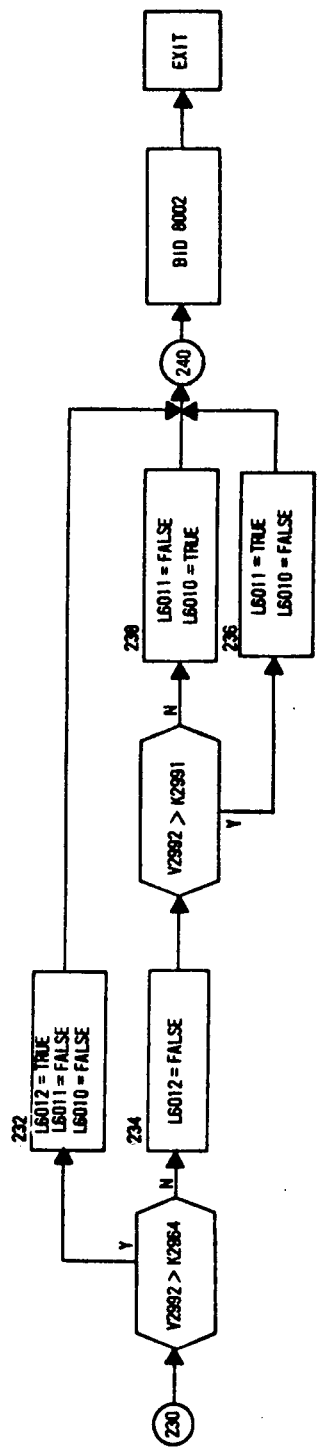
FIG. 7G2

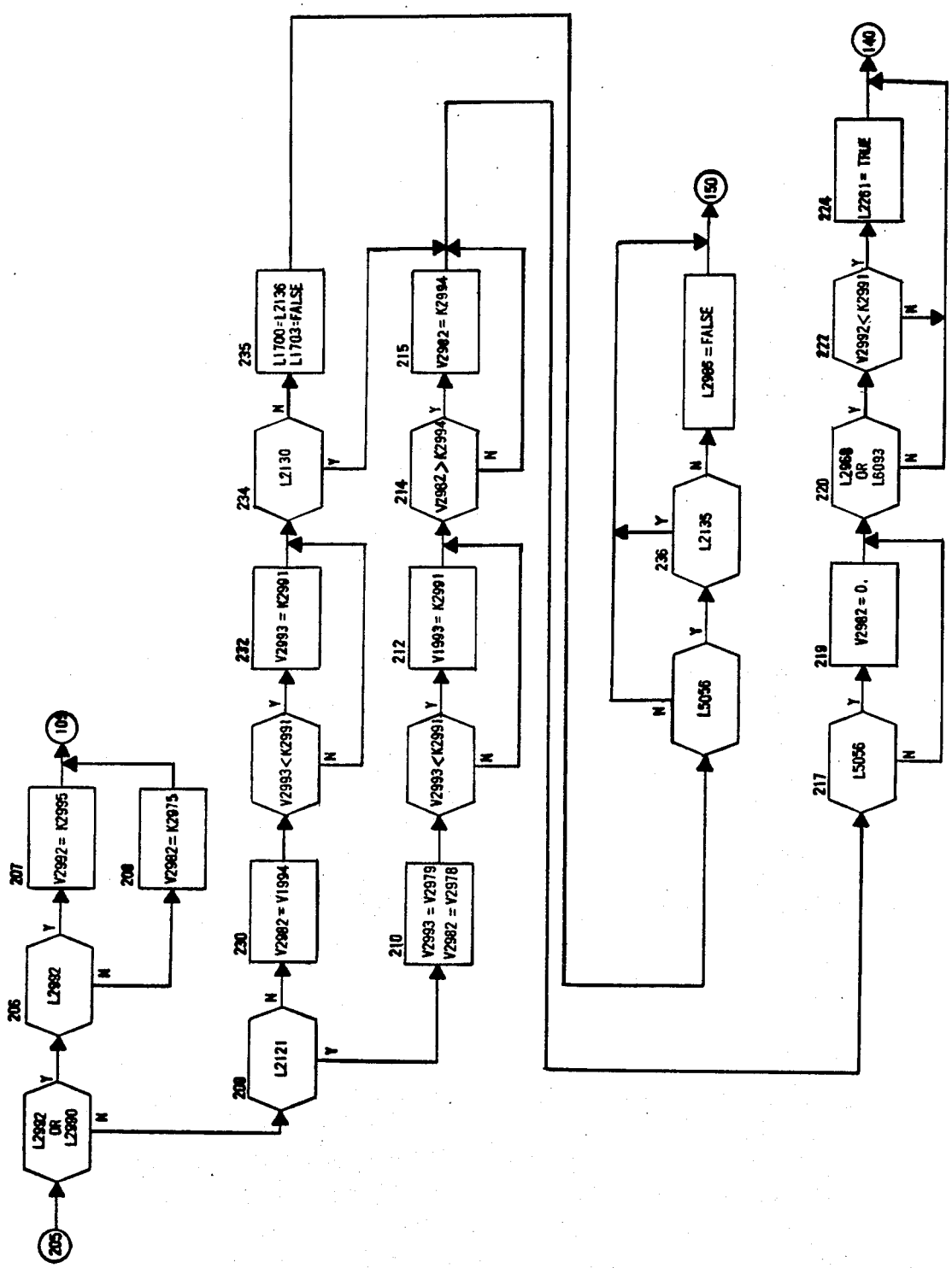
FIG.7H2

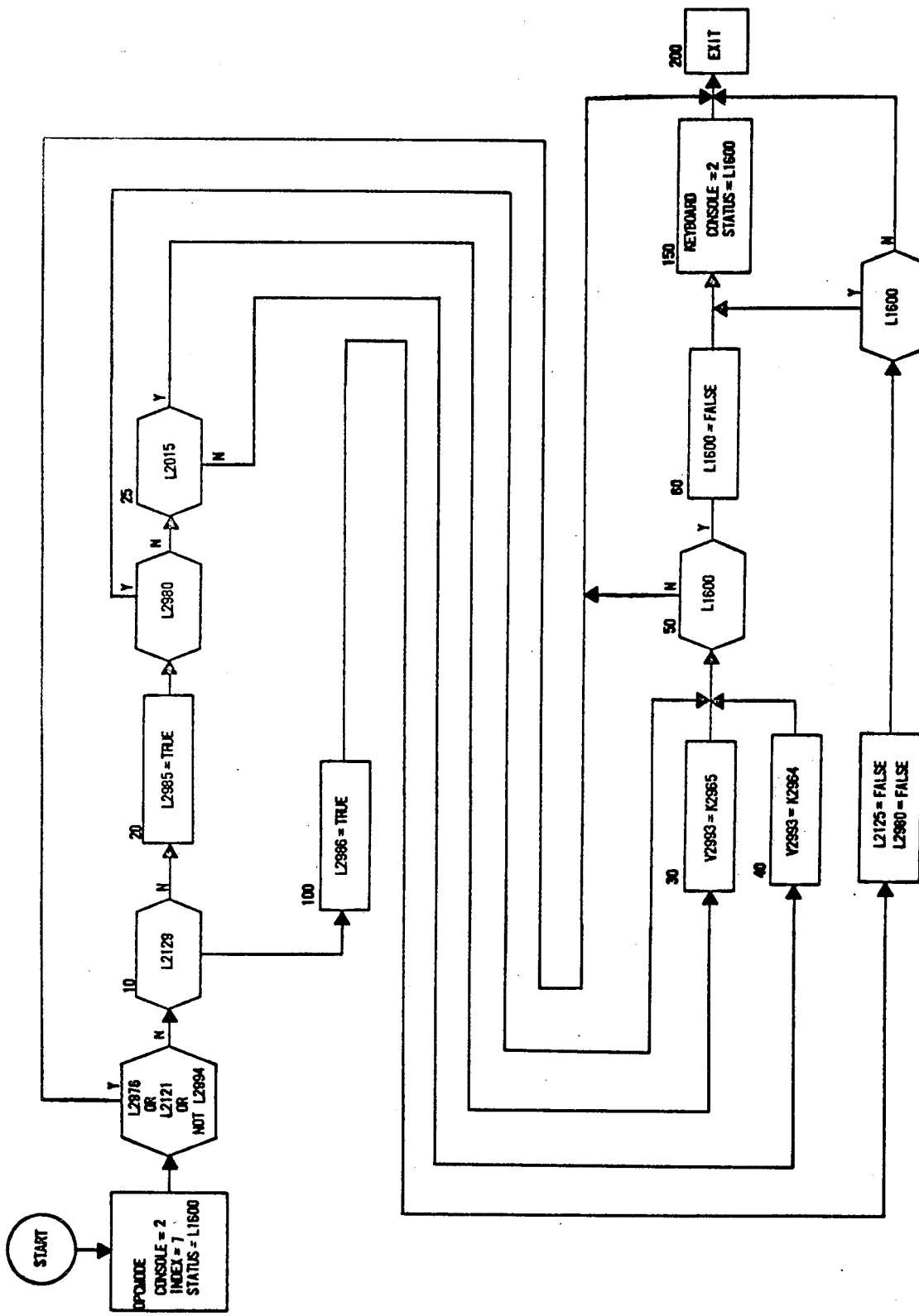
FIG. 8A2

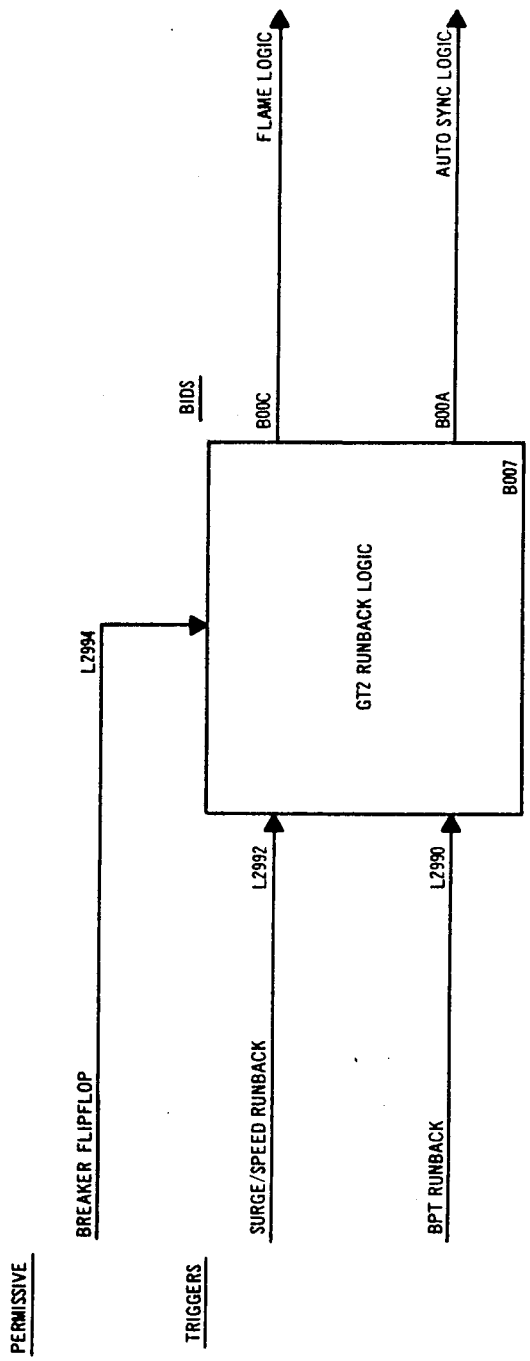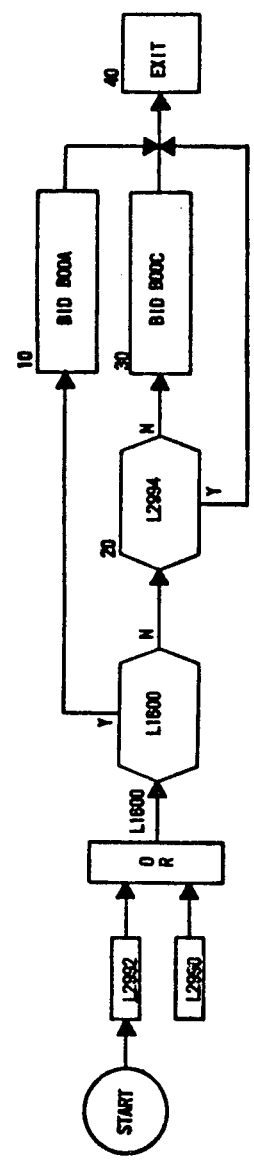
FIG.8B1
FIG.8B2

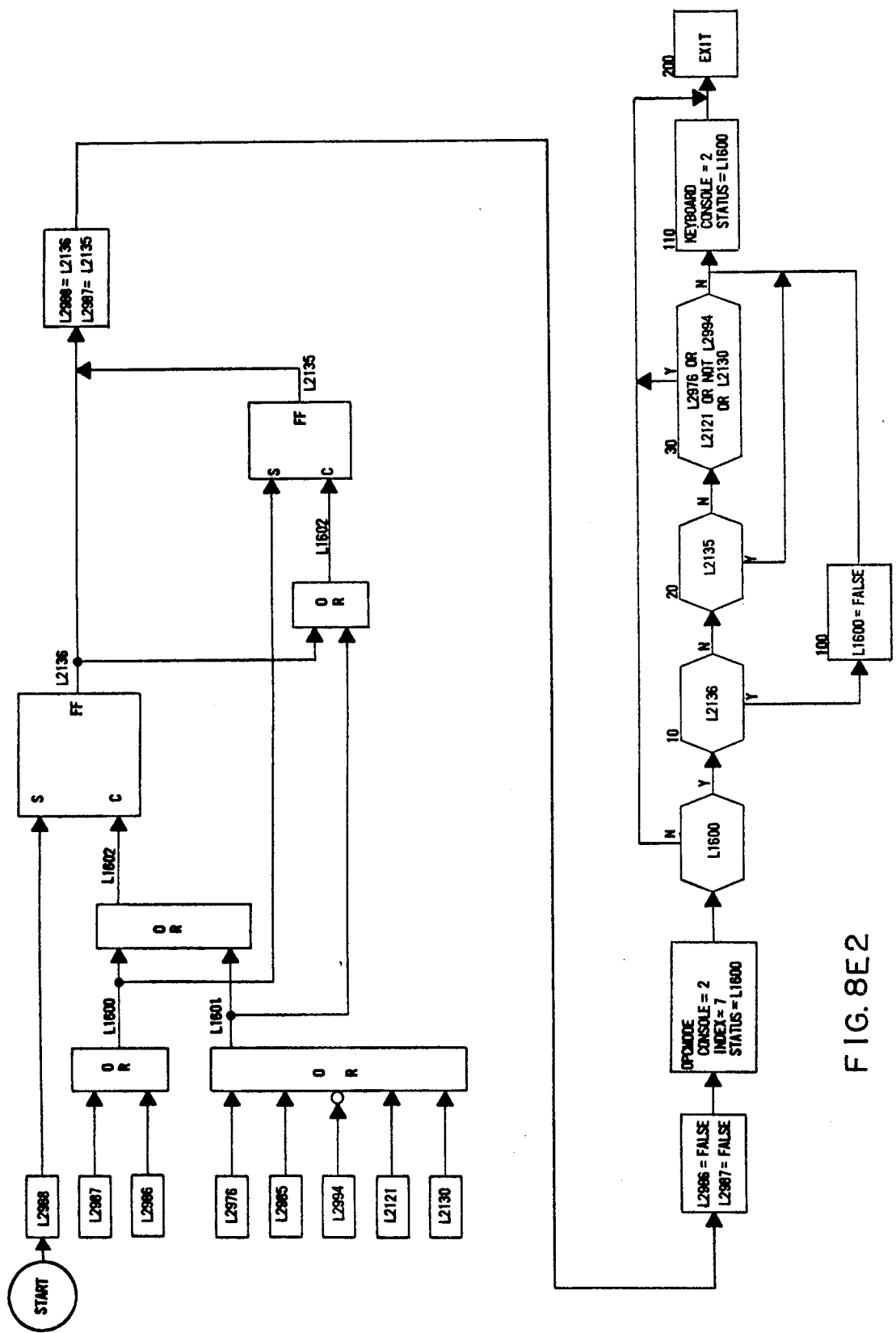
FIG. 8E2

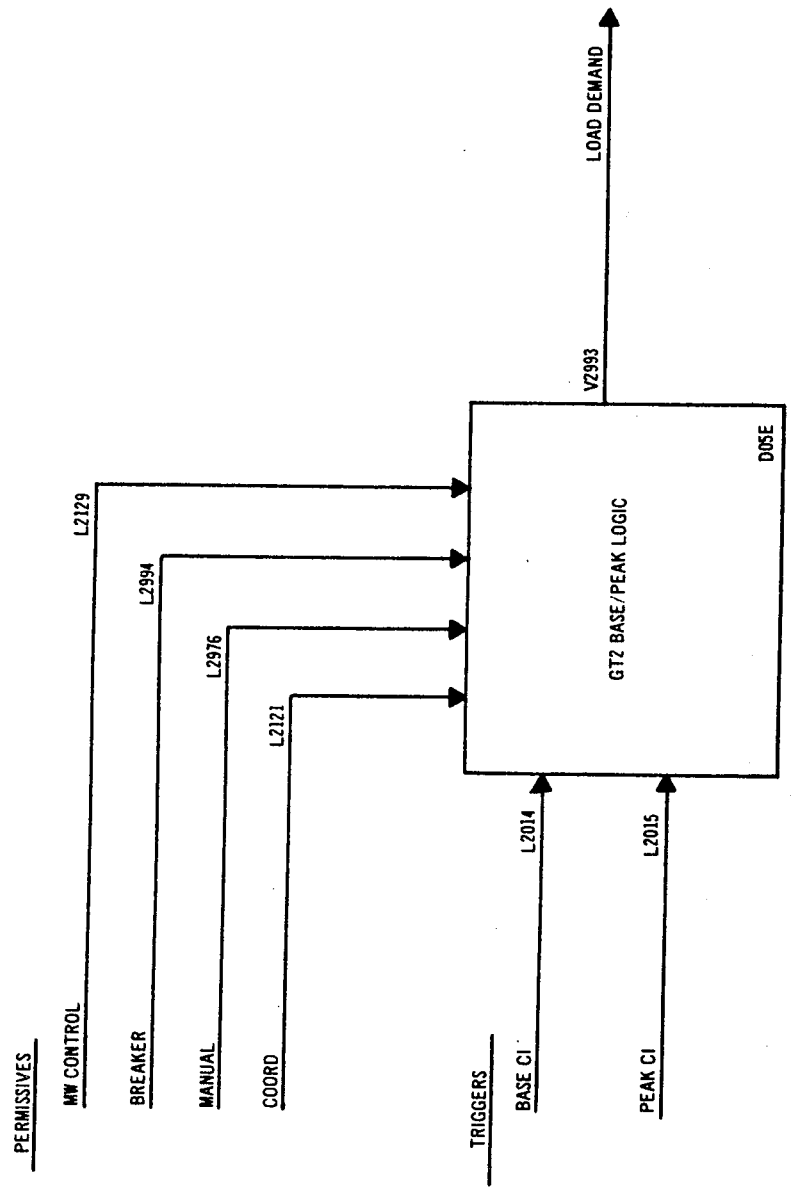
FIG.8F1

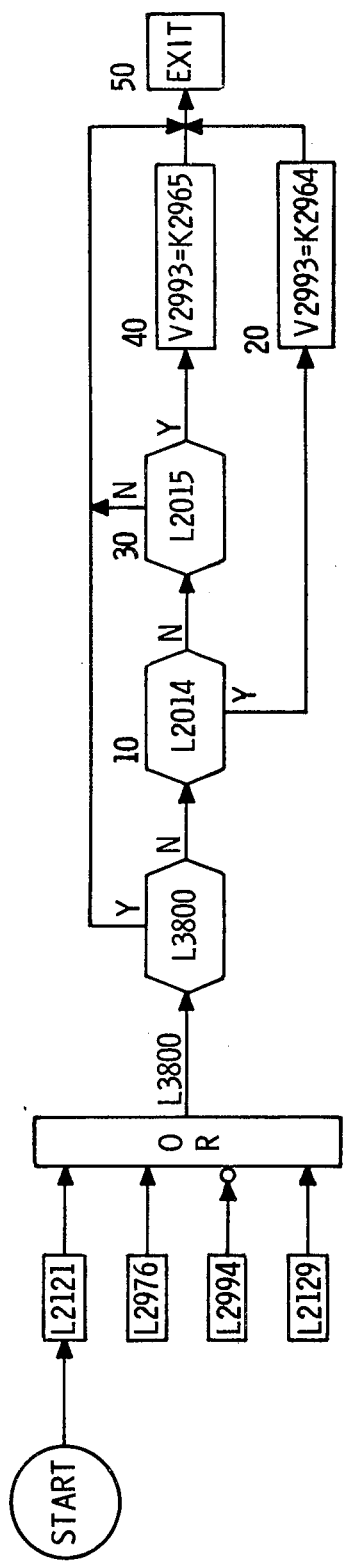
FIG. 8F2

SMOOTH AND HIGHLY RESPONSIVE GAS TURBINE TEMPERATURE LIMIT CONTROL ESPECIALLY USEFUL IN COMBINED CYCLE ELECTRIC POWER PLANTS

CROSS-REFERENCE TO RELATED APPLICATION

Reference is made to the following patent applications:

1. Ser. No. 399,790, filed on Sept. 21, 1973 by L. F. Martz, R. W. Kiscaden and R. Uram, entitled "An Improved Gas Turbine And Steam Turbine Combined Cycle Electric Power Generating Plant Having A Coordinated And Hybridized Control System And An Improved Factory Based Method For Making And Testing Combined Cycle And Other Power Plants And Control Systems Therefor", assigned to the present assignee and hereby incorporated by reference.

2. Ser. No. 319,114, filed by T. Giras and J. Reuther on Dec. 29, 1972 as a continuation of an earlier filed application Ser. No. 082,470, entitled "An Improved System And Method For Operating Industrial Gas Turbine Apparatus And Gas Turbine Electric Power Plants Preferably With A Digital Computer Control System" and assigned to the present assignee, and related cases referred to therein.

3. Ser. No. 495,765, filed concurrently herewith by Lyle F. Martz and Richard J. Plotnick, entitled "Combined Cycle Electric Power Plant Having A Control System Which Enables Dry Steam Generator Operation During Gas Turbine Operation", assigned to the present assignee and hereby incorporated by reference.

4. Ser. No. 250,826 filed on May 5, 1972 by J. Gomola et al, entitled "A Digital Computer Monitored And/Or Operated System Or Process Which Is Structured For Operation With An Improved Automatic Programming Process And System", assigned to the present assignee and hereby incorporated by reference.

BACKGROUND OF THE INVENTION

The present invention relates to improved outlet temperature limit operation of gas turbines and more particularly to combined cycle electric power plants in which gas turbines are operated with improved temperature limit operation.

One of the more critical parameters of gas turbine operation is the cycle temperature, and specifically the turbine inlet temperature. The cycle temperature should be high enough to maximize power and operating efficiency and at the same time it should be low enough to protect the turbine and enhance its life. Thus, a relatively narrow temperature band exists for optimum turbine operation and temperature overshoot during any transient due to any system disturbance, such as a load change, should be minimized. Temperature overshoots can be caused when the turbine is operated with temperature limit control as the primary control or when the turbine is operated with a speed/load control as the primary control and a temperature limit control as a backup control.

To prevent the turbine inlet or cycle temperature from exceeding a predetermined value, it is generally necessary to obtain downstream indications of turbine outlet temperature, i.e. blade path or exhaust temperature or both, and develop one or more temperature limit signals for the fuel control in accordance with the temperature indications and a blade path and/or exhaust temperature reference. In turn, the temperature reference is a variable value dependent on combustor shell pressure so that the turbine inlet temperature is held constant as the turbine pressure and temperature drops vary with varying fuel flows and varying ambient temperatures.

Blade path temperature control generally provides faster response than exhaust temperature control since it is based on temperature measurements made at points closer to the turbine inlet, but stratification often occurs in the blade path flow about the turbine annular space, and blade path temperature indications can differ significantly according to the annular location of the thermocouples. At the outlet flow points at which exhaust temperature indications are generated, outlet flow mixing will normally have dissipated any stratification, but the lower mass-velocity results in significantly slower thermocouple response time as compared to the response time in the blade path region where the mass-velocity is much higher.

Temperature limit control has been used as a primary control during startup and as a primary control during loading. Such control has been implemented with the use of a temperature control signal based on blade path temperature as well as with the use of a temperature control based on exhaust temperature. Further, in certain prior art relaypneumatic controls and in the digital/analog hybrid electropneumatic control disclosed in the aforementioned copending application Ser. No. 319,114, a blade path temperature control and an exhaust path temperature control have been employed to generate separate temperature limit values with the final temperature control limit value being a low selected value of the two.

It has been generally desirable further to improve the smoothness and the responsiveness of gas turbine temperature limit operation to achieve better efficiency and turbine life enhancement, and it has been especially desirable to do so in combined cycle plant operation where plant generation capacity is dependent directly on gas turbine availability and indirectly on gas turbine availability to the extent that other power generation apparatus must be cut back in operating level with a gas turbine shutdown. More particularly, it has been desirable to achieve reduced turbine temperature overshoot and generally better transient response on temperature limit control while permitting flexible, efficient and responsive operation of the turbine.

The description of prior art herein is made on good faith and no representation is made that any prior art considered is the best pertaining prior art nor that the interpretation placed on it is unrebuttable.

SUMMARY OF THE INVENTION

In the preferred form of the invention, a gas turbine is employed in a combined cycle electric power plant and it is provided with a control system having a fuel control for the gas turbine and a speed/load control which generates a fuel demand for the fuel control. Means are provided for limiting the operation of the fuel control so as to limit the blade path temperature with dependence on the exhaust temperature thereby to provide improved smoothness and responsiveness of temperature limit control with enhanced turbine and plant efficiency and life.

BRIEF DESCRIPTION OF THE DRAWINGS

FIG. 5B shows a blade path temperature reference characteristic employed during startup;

FIG. 5C shows the manner in which turbine outlet temperature varies as a function of time during startup;

FIGS. 7A–7C, 7D1, 7D2, 7E, 7F1–7F3, 7G1, 7G2, 7H1, and 7H2 show flow charts indicating the manner in which the various controls and algorithms are programmed in a digital computer included in the control system;

FIGS. 8A1, 8A2, 8B1, 8B2, 8C, 8D, 8E1, 8E2, 8F1, and 8F2 show functional block diagrams and flow charts for various logic chains employed in the system.

DESCRIPTION OF THE PREFERRED EMBODIMENT

A. General Plant Description

Figure 1:
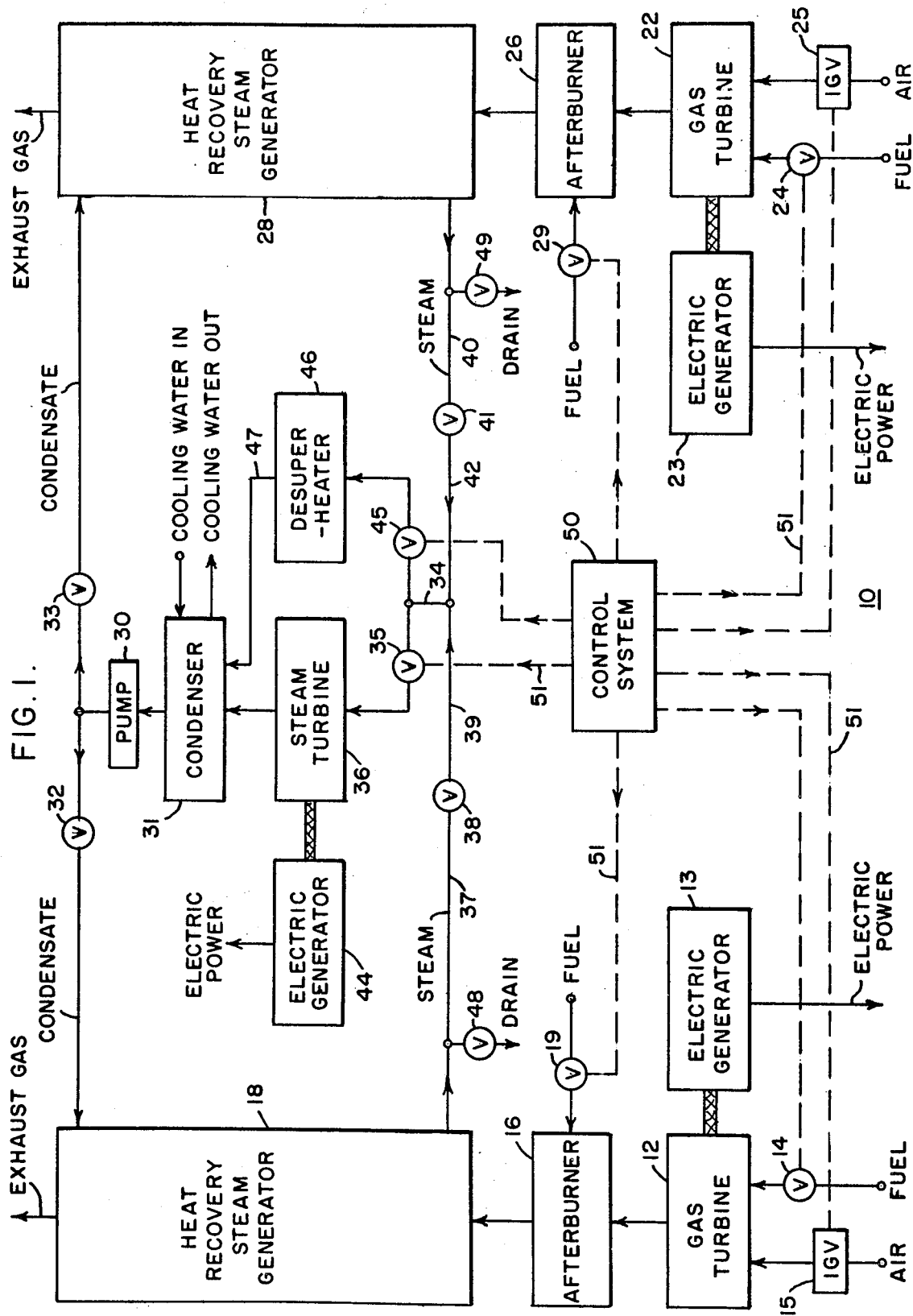
FIG. 1 shows a schematic view of a combined cycle electric power plant in which there is employed a gas turbine in accordance with the principles of the invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 ia burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. in terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

B. Gas Turbine Mechanical Structure

Figure 2A:
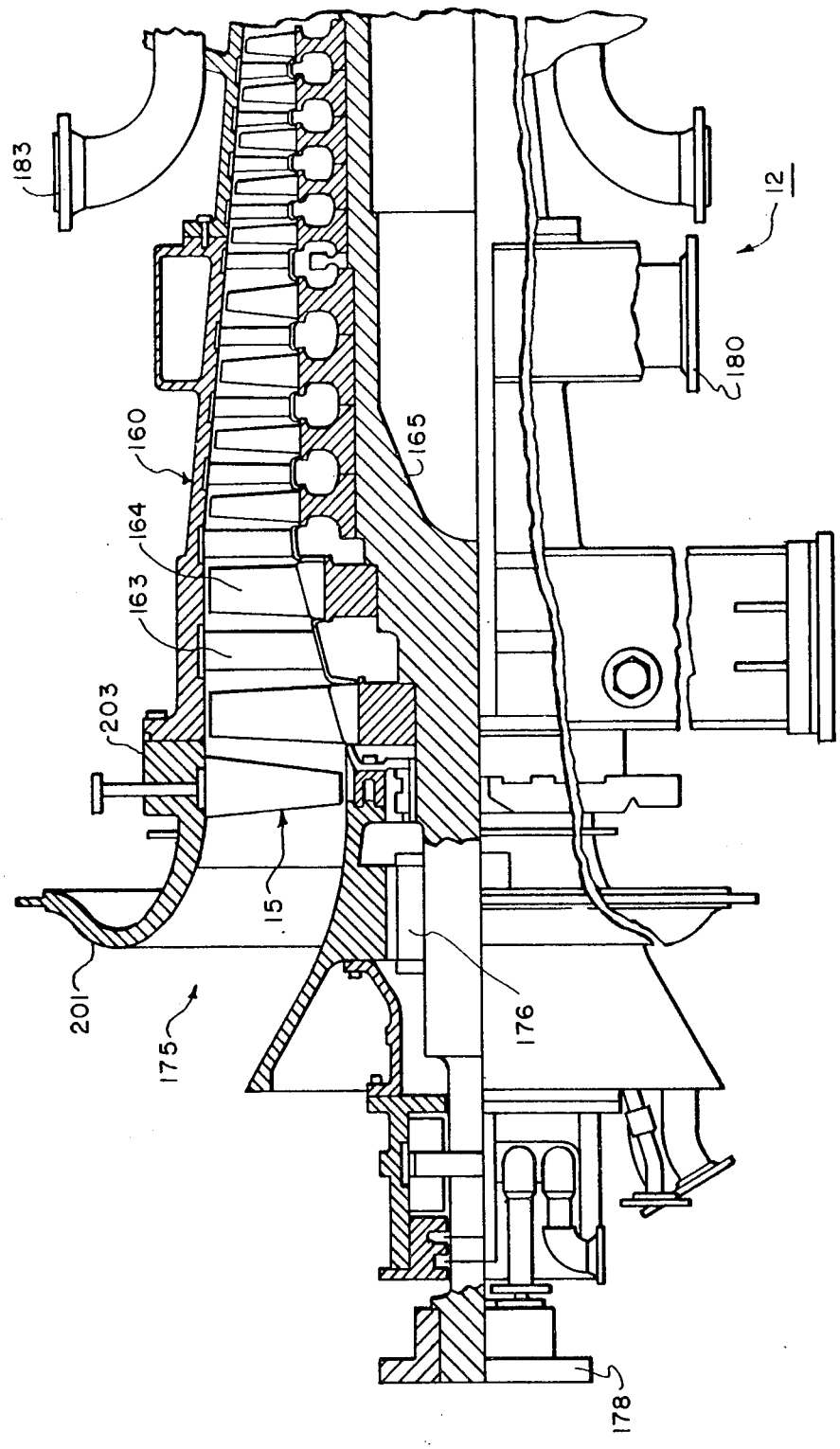
FIGS. 2A and 2B illustrate a gas turbine structure which can be employed in the plant of FIG. 1.
Figure 2B:
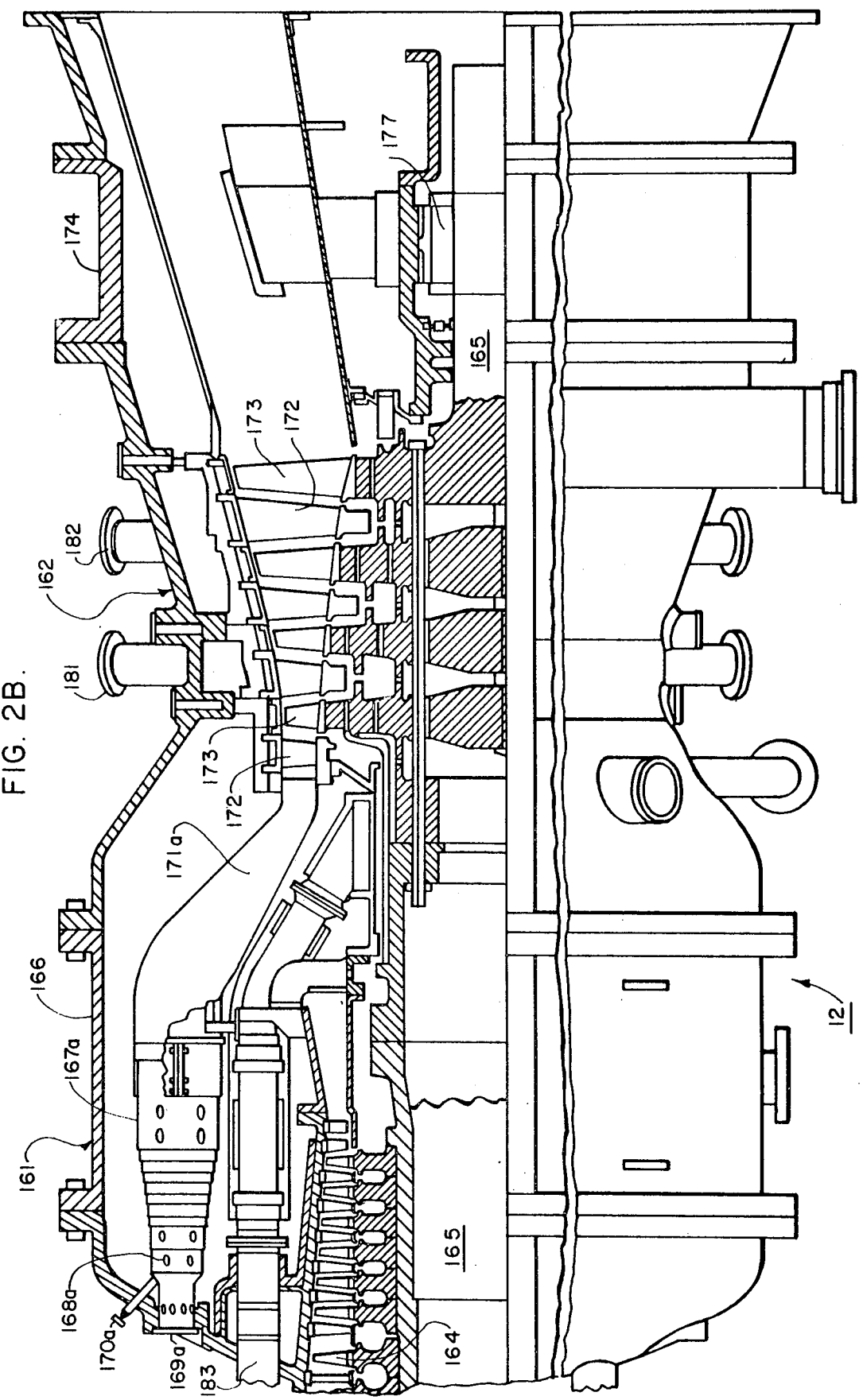

Referring now to FIGS. 2A and 2B, there is shown a longitudinal, partially cross-sectional, elevational view of the No. 1 gas turbine 12. FIG. 2A shows the left-hand half of the view and FIG. 2B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pennsylvania. It is of the simple open cycle type and employs a single-shaft two-bearing construction in which no bearings are located in a high pressure, high temperature zone. It is constructed for operation at a rated speed of 3,600 rpm and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a –167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of a fuel nozzle 169a, a spark plug 170a serving to provide for the initial ignition of the fuel. This fuel is burned in the combustor 167a and the resulting high temperature, high pressure gas is supplied by way of a combustor outlet duct 171a to the inlet of the turbine section 162.

The turbine section 162 is a four stage turbine having interspersed sets of stationary blades 172 and rotary blades 173, the latter being located on the rotor structure 165. The high temperature high pressure gas from all of the combustors 167a–167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency.

The two bearings which support the single rotor structure 165 of the gas turbine 12 are indicated at 176 and 177. As seen, these bearings 176 and 177 are located outside of any high pressure high temperature zone. The electric generator 13 is coupled to the cold or compressor end 178 of the rotor structure 165 to avoid potential misalignment problems. Some air is removed from the compressor 160 by way of outlet 180, externally cooled and filtered by an air cooler and returned to the turbine section 162 to cool the first two sets of stationary blades 172 and the first set of rotary blades 173. The cooling air for the stationary blades 172 enters through inlets 181 and 182, while the cooling air for the first set of rotary blades 173 enters via inlet 183.

For more detail on the structure of other apparatus in the plant 10, reference is made to Ser. No. 495,765.

C. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hydrid form, and the digital/analaog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 3:
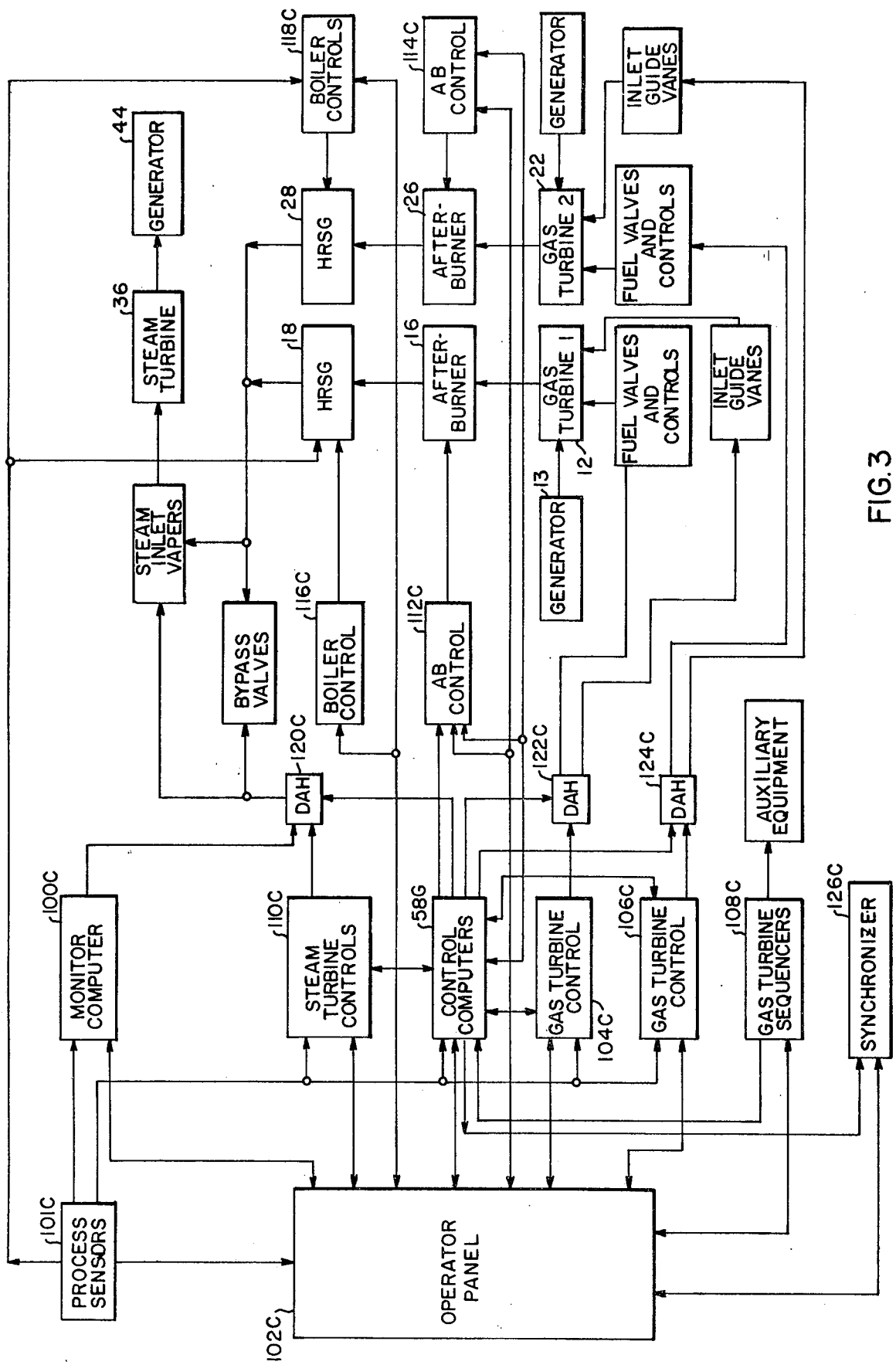
FIG. 3 shows a schematic view of a control system arranged to operate the plant of FIG. 1 in accordance with the principles of the invention.

As shown in FIG. 3, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controns 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e. they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

D. Blade Path Temperature Limit Control System

Figure 4A:
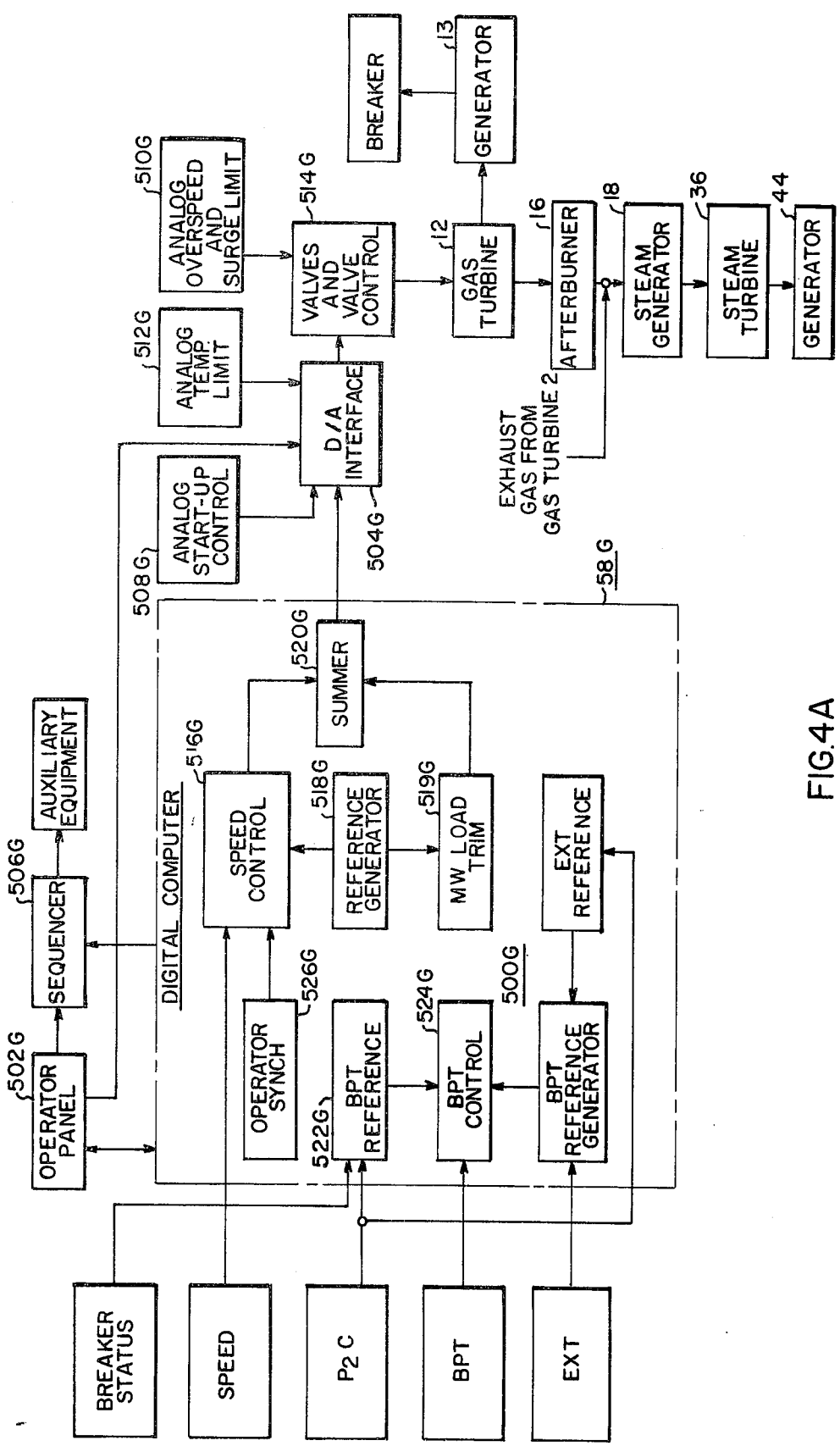
FIG. 4A shows a schematic diagram of the plant control system with elements of a gas turbine temperature limit control illustrated to indicate more particularly the preferred manner of embodying the invention.
Figure 4:
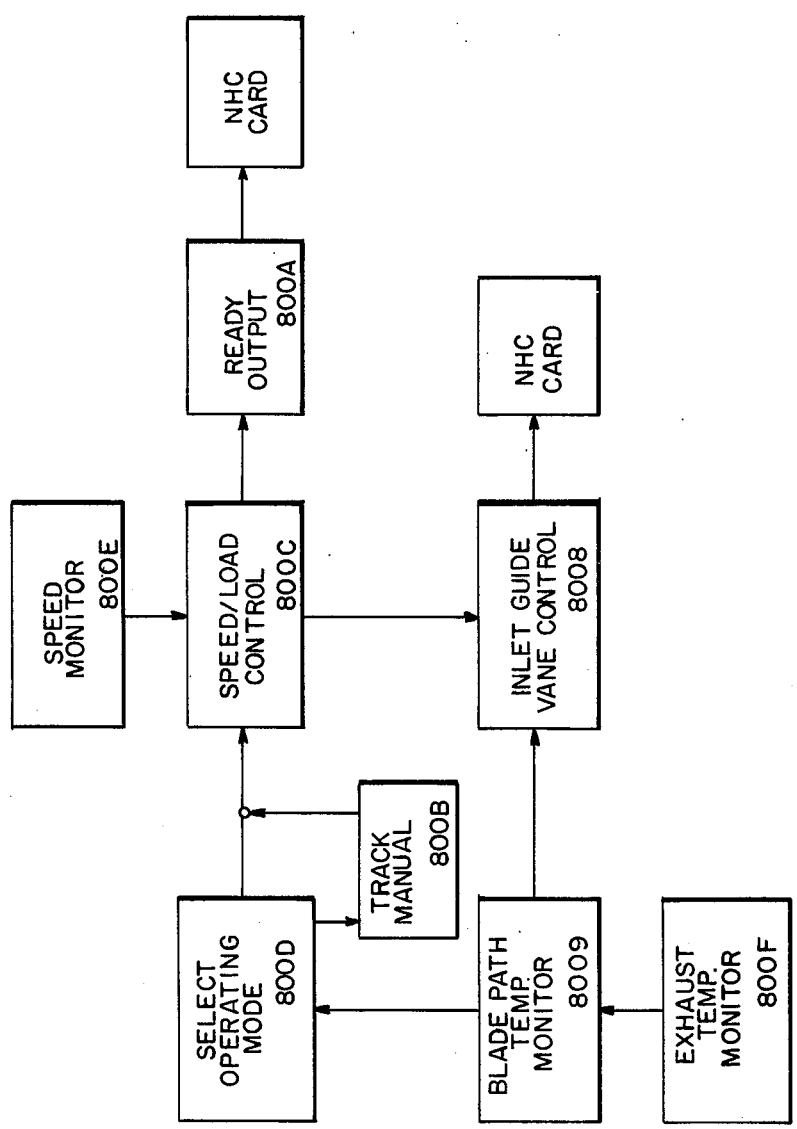
FIG. 4B shows a digital control part of the control system.

As shown in FIG. 4, the preferred embodiment comprises a gas turbine blade path temperature limit control subsystem 500G which is included in the plant control system 50 to limit blade path and exhaust path gas temperature reliably and efficiently during the automatic mode of gas turbine operation. The manual-/automatic status of the plant control system 50 is fixed by operator selection at an operator panel 502G or by a computer rejection or failure to manual. A digital-/analog hybrid interface 504G includes manual-/automatic logic circuitry to detect when the gas turbine 12 is to be on manual control and to make bumpless switching operations which implement the applicable control mode.

In automatic control, a programmed digital control computer 58G generates a fuel reference from the hybrid interface in the coordinated and the operator automatic modes to provide MW load control and to schedule fuel for automatic startup. It also initiates turbine startup by a sequencing system 506G under coordinated control. Generally, the sequence of 506G sequences the gas turbine 12 through the startup process by starting and stopping auxiliary equipment when sequencing permissives are generated, and it trips the turbine if certain conditions develops. Further, the sequencer 506G generates logicals for the turbine controls, i.e. a master RELAY ON signal, a FUEL ON signal, a breaker status signal, a fuel select and transfer signal, and a FLAME ON signal.

In the operator analog or manual mode, the operator controls the turbine loading operation by generating a fuel reference from the hybrid interface 504G, and a startup control 508G generates a fuel reference from the hybrid interface during startup. An analog control 510G, including overspeed and surge limit controls, functions during the coordinated and operator automatic modes of operation as well as the operator analog or manual modes of operation. An analog temperature limit control 512G functions only during the manual or operator analog mode as disclosed more fully in a copending and coassigned patent application Ser. No. 495,694 entitled "A Combine Cycle Electric Power Plant And A Gas Turbine Having An Improved Outlet Temperature Limit Control", filed by J. Smith and T. Reed concurrently herewith.

The hybrid interface 504G generates a fuel reference for application to a fuel valve control circuit in block 514G. The hybrid output fuel reference value is that value resulting from computer control or that value resulting from operator control from the operator panel, subject to limit action. Transfer between automatic and manual fuel references is made bumpless by the functioning of the hybrid interface 504G in conjunction with the automatic and backup controls.

Figure 5A:
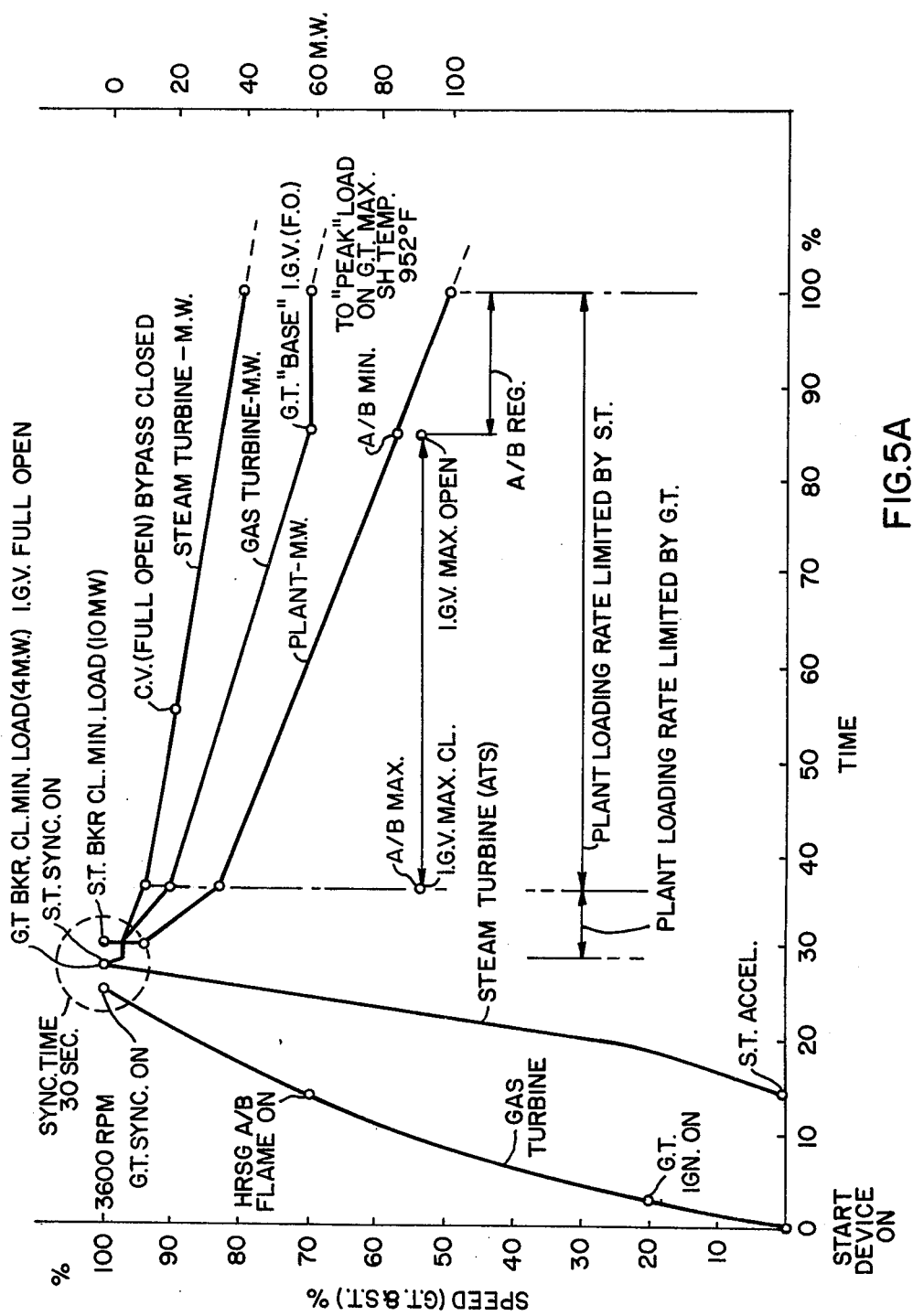
FIG. 5A shows a schematic diagram of the sequence of plant operations.

The digital blade path temperature limit system 500G functions during startup and loading operations in the automatic mode. The sequencing of the combined cycle plant operations is graphically illustrated in FIG. 5A. During gas turbine startup, a blade path temperature reference is generated as a function of the combustor shell pressure, and a representation of actual blade path temperature is compared to the blade temperature reference. A digital speed control 516G operates with a reference generator 518G to generate a fuel reference through a summer block 520G. Normally, as a result of the system design, the actual outlet gas temperature varies during startup as schematically illustrated as a function of time in FIG. 5C and does not reach limit conditions defined by a blade path temperature reference block 522G in which there is stored a blade path reference characteristic like that shown in FIG. 5B. Therefore, no temperature limit control action is normally initiated by blade path temperature control block 524G during the startup period which as shown in FIG. 5A is approximately 25 percent of the total plant startup time, or in this instance about 15 minutes.

Figure 5D:
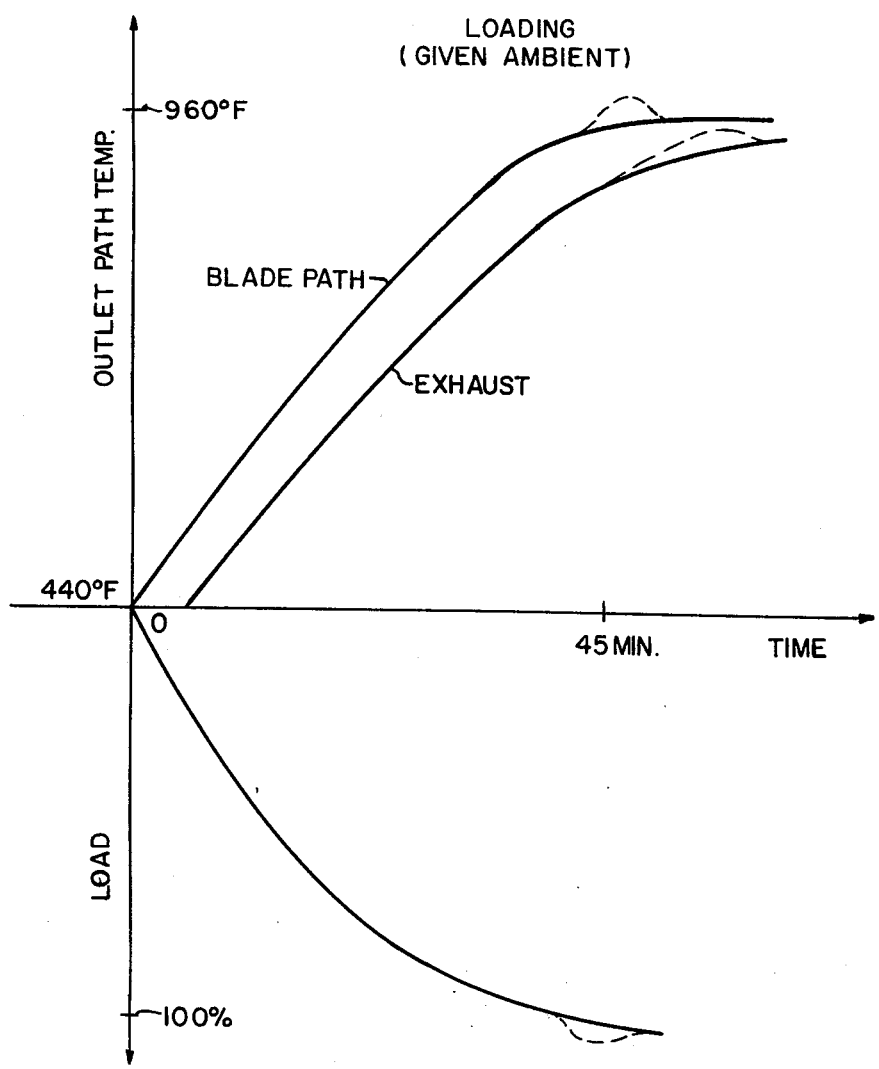
FIG. 5D shows the manner in which the turbine outlet temperature varies as a function of time during loading.
Figure 5E:
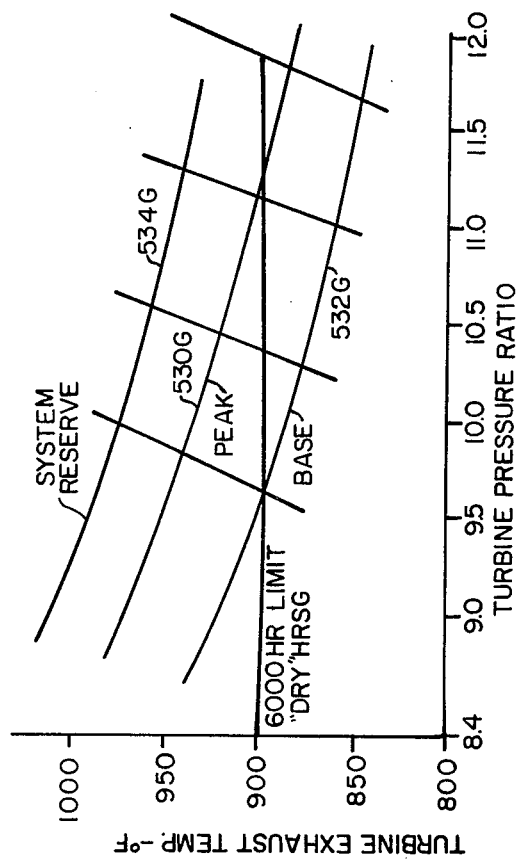
FIG. 5E shows a temperature reference characteristic employed during loading operation.
Figure 5F:
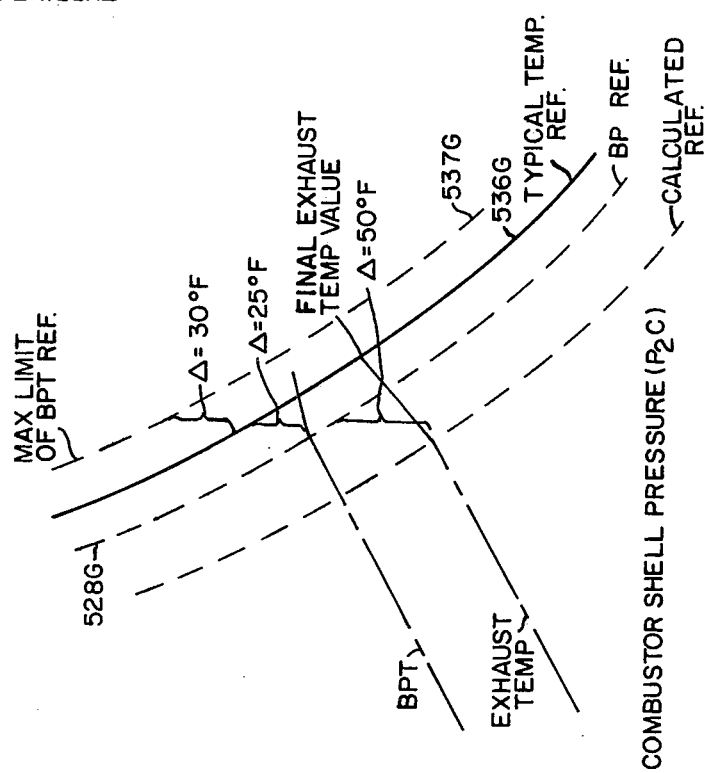
FIG. 5F shows a graphical representation of the manner in which the blade path temperature reference is varied in accordance with the present invention.

When the generator 13 is synchronized by an external synchronizer or by operator control through block 526G, the breaker status changes from open to closed, and for base load operation the blade path temperature reference block 522G generates a blade path temperature reference in accordance with a temperature-combustor shell pressure characteristic indicated by dotted line 528G in FIG. 5F. As shown in FIG. 5E, a blade path temperature limit characteristic 530G for peak operation is scaled at higher values than the base load characteristic 532G. A blade path temperature limit characteristic 534G for a system reserve operation also can be employed, and it is scaled higher than the peak load characteristic. Thus, as the generator 13 is loaded the applicable blade path temperature limit characteristic is that which corresponds to the selected load mode. For description purposes, it will be assumed hereinafter that the base load operation is the selected mode.

To load the turbine 12 a demand is placed on the reference generator 518G and it ramps the reference toward the demand value with correction provided by a load trim 519G. The output load fuel reference from the summer 520G is the sum of a stored idle speed fuel reference from the speed block 516G and the corrected or uncorrected reference from the generator block 518G as more fully explained in a copending and coassigned patent application Serial No. 495,730, entitled "A Combined Cycle Electric Power Plant And A Gas Turbine Having Improved Megawatt Load Control", filed by T. J. Reed and J. R. Smith concurrently herewith and hereby incorporated by reference.

As the turbine 12 is loaded, the blade path temperature control 524G places a hold or a cutback action on the fuel reference through the reference generator 518G if the blade path temperature exceeds the applicable blade path temperature limit value derived from the applicable characteristic at the measured combustor shell pressure. Once the turbine is loaded to the point where the actual exhaust temperature reaches a predetermined value below a limit value indicated on an exhaust temperature limit characteristic 536G (FIG. 5F) the blade path temperature reference is increased, preferably incrementally, until the actual exhaust temperature reaches the limit exhaust temperature value determined from the characteristic 536G.

In the present case, the initial blade temperature reference characteristic 528G provides a temperature limit 25°F below the exhaust temperature limit associated with the exhaust temperature limit characteristic 536G. Preferably, the exhaust temperature limit function permits the blade path temperature reference to increment upwardly when the actual exhaust temperature is 75°F below the exhaust temperature limit based on the exhaust temperature limit characteristic 536G. When the exhaust temperature has reached its limit value on the characteristic 536G, the blade path temperature is at some higher value.

An upper blade path temperature absolute limit value is preferably employed. Thus, in this case a blade path temperature limit reference is defined by a blade path temperature limit characteristic 537G which is displaced 30°F above the exhaust temperature limit characteristic 536G. In operation, the final blade path temperature limit reference produced by incrementation of the reference upwardly under exhaust temperature loop control will typically be between 5°F and 15°F above the exhaust temperature limit characteristic 536G. The final blade path temperature limit is a particular value for each installed turbine, and once that value is determined for an installed gas turbine, it is preferable that the blade path absolute temperature limit characteristic be adjusted downwardly from 30°F above the exhaust temperature limit characteristic 536G to the empirically detected value, say to 10°F above the exhaust temperature limit characteristic 536G. In this manner, a faster corrective response can be achieved by blade path temperature limit control if a blade path temperature increase occurs beyond the limit value defined by the resultant blade path temperature limit characteristic corresponding to exhaust temperature operation on the characteristic 536G.

In a typical power plant turbine, the system response time to a change in fuel demand is as follows:

| Valve | Combustor | Transport | Blade Path Thermocouple | Exhaust Path Thermocouple |
|---|---|---|---|---|
| 2 seconds | 90 milliseconds | Less than 1 second | 3 seconds | 20 seconds |

Accordingly, with the described system, fast blade path temperature limit control is achieved with a moderating effect being placed on the blade path temperature control by an exhaust path control as the blade path temperature limit is approached.

Generally, all temperature and pressure signals applied to the digital computer 58G are first checked against limits for reasonability. Two averages of four blade path temperature thermocouples are compared and if they are within 50°F they are averaged and high selected with an average of eight blade path temperatures to produce the blade path temperature control signal. If the two averages are different by more than 50°F, the condition is alarmed and the average of eight becomes the control signal. Proportional plus derivative control action is applied to the feedback blade path temperature representation prior to comparison to the blade path temperature reference. As already indicated, a hold or a cutback in the fuel reference is generated if the actual blade path temperature is greater than the reference blade path temperature to prevent excessive blade path temperature and thereby to prevent excessive turbine inlet temperature. Preferably, when the exhaust temperature is within 75°F of the exhaust temperature reference, the blade path temperature reference is permitted to increase at a rate equal to a preset constant multiplied by the difference between the exhaust temeperature reference and the exhaust temperature. The preset constant is preferably selected to match the response of the exhaust thermocouples. The blade path temperature reference is preferably increased at this rate for an adjustable time period such as 10 seconds, and then the rate is reset to zero until the next exhaust temperature input is received, i.e. at a 30 second sampling period.

The blade path temperature cutback or override reduces the load reference, changes the rate of change to correspond with the runback requirements, and places the system in hold with respect to the load demand as long as the load demand is greater than the load reference. This allows the gas turbine to operate at any load up to the base or peak temperature limit or at the selected base or peak temperature limit if the load demand requires higher fueling than that permitted by existing temperature limits. The load increases or decreases as ambient conditions change the temperature limit if the load demand is greater than that permitted by the selected temperature limit. Controller windup and deadtime are eliminated by applying the blade path temperature override in the manner described herein.

As a result of system operations, smoother loading is achieved as shown by solid lines in FIG. 5D. The dotted overshoot schematically illustrates how the temperature and loading behavior can be without the system damping provided by the functioning of the described system. As temperature limits are approached, the gas turbine picks up decreasing increments of load until either the exhaust temperature reaches the exhaust temperature limit or reference characteristic or thee blade path temperature reaches its maximum limit of 30°F above the exhaust temperature reference characteristic. Blade path and turbine inlet temperature overshoots are thus reduced or avoided through this smoothing process. Nonetheless, relatively fast blade path temperature response is provided. Accuracy of temperature limit control operation results from the fact that the exhaust temperature measurements used in blade path temperature reference modification are made by thermocouples which are located sufficiently far from the turbine blade path to avoid the effect of temperature stratification.

SYSTEM FUNCTIONS

Figure 6A:
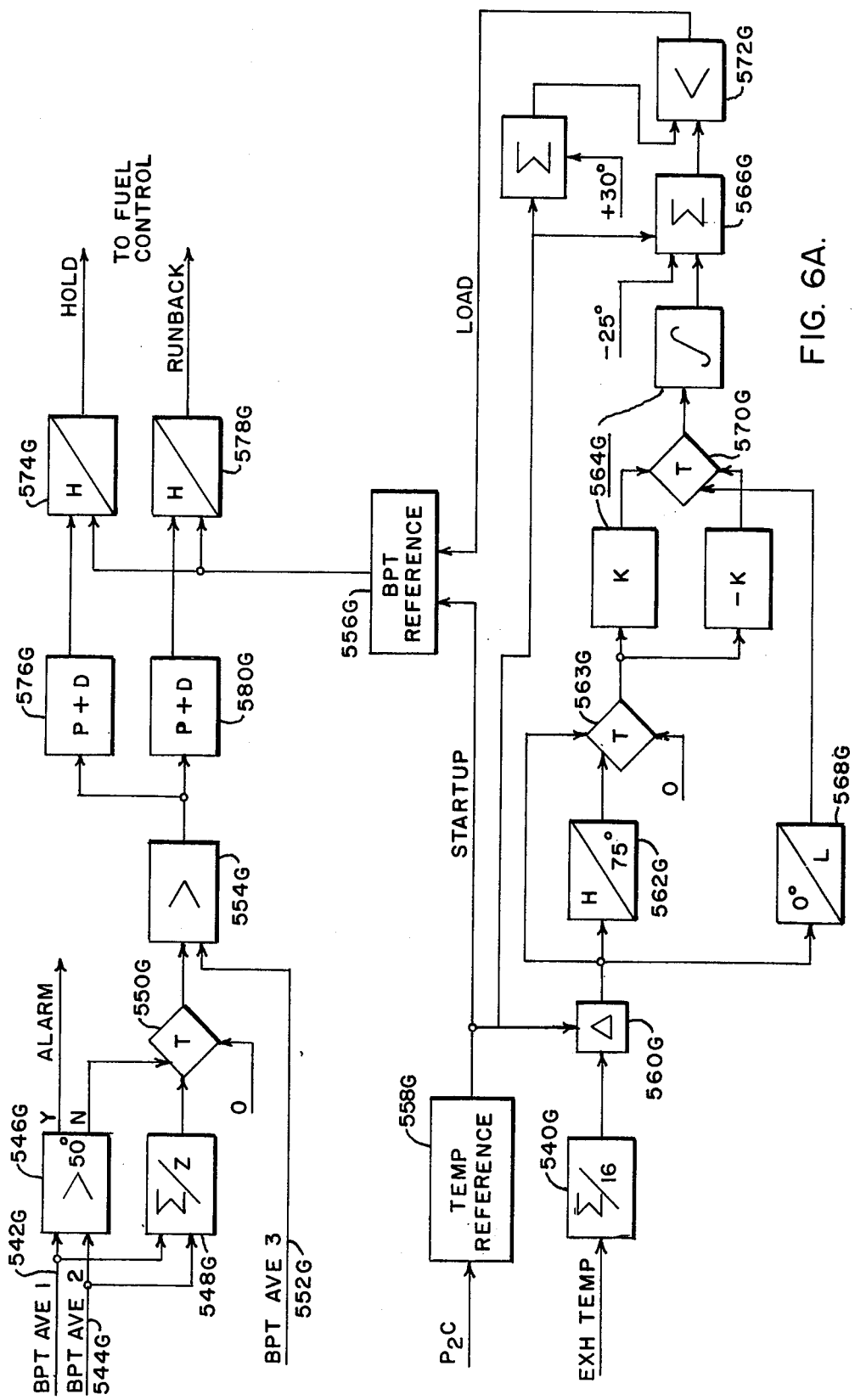
FIGS. 6A and 6B show respective functional representations of a digital temperature control employed in accordance with the invention in the plant control system.
Figure 6B:
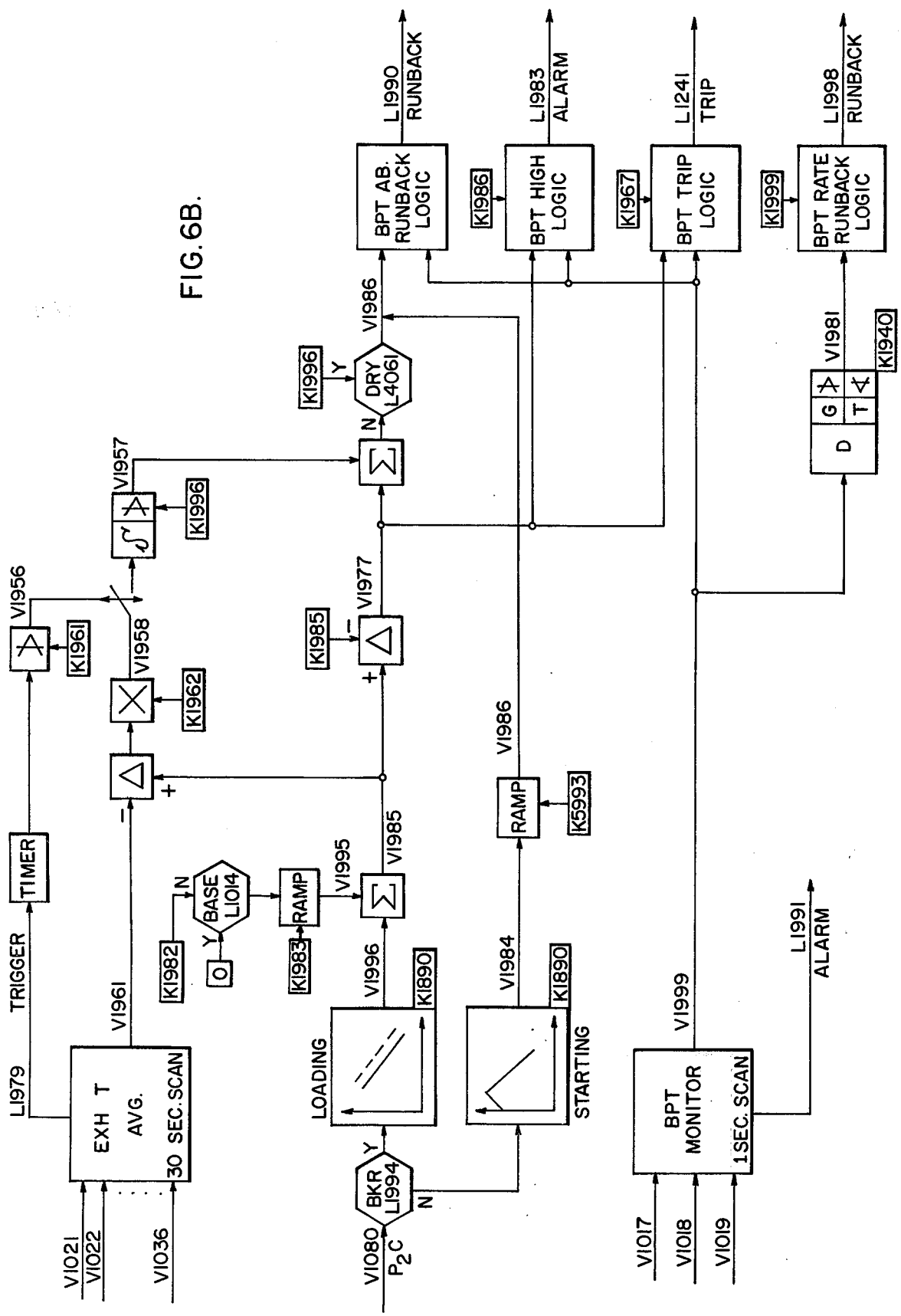

Portions of the blade path temperature limit control system 500G are shown in somewhat greater functional detail in FIG. 6A and with certain additional program details in FIG. 6B. The signals from 16 exhaust thermocouples are scanned and averaged in block 540G every 30 seconds in this instance. As indicated by the reference characters 542G and 544G, respective average blade path temperature signals are generated from two groups of four blade path thermocouples. If the two average signals 542G and 544G differ by more than 50°F, block 546G generates an alarm.

Block 548G generates an average of the two average signals 542G and 544G. A switch block 550G enables further downstream use of the output of the block 548G if the block 546G indicates that the spread between the signals 542G and 544G is less than 50°F. Another blade path temperature average signal 552G is generated as an average of eight additional blade path thermocouple signals and a high selector block 554G generates an output corresponding to the highest of the signal 552G and of the output from the switch block 550G.

During startup, a block 556G generates a blade path temperature reference from a characteristic stored in block 558G as a function of measured combustor shell pressure. Exhaust temperature is not employed during startup because of its very slow response characteristic.

During load operation, a block 560G generates the difference between the temperature limit or temperature reference derived from the applicable temperature limit or reference characteristic and the average exhaust temperature signal generated by the block 540G. If the difference is greater than 75°, a high monitor block 562G operates a switch block 563G to apply a zero input to a downstream exhaust temperature limit controller 564G. A summer block 566G accordingly causes the block 556G to generate a blade path temperature limit based on a temperature equal to 25° below that associated with the characteristic stored in the temperature reference block 558G.

Once the exhaust temperature difference reaches less than 75°F, the monitor block 562G operates the switch block 563G to transmit the output from the exhaust temperature difference block 560G to the input of the exhaust temperature limit controller 564G which includes a proportional element and an integrator element. If a negative value exists, i.e. if the actual exhaust temperature exceeds the exhaust temperature limit, a low monitor block 568G operates a switch block 570G to apply a negative gain to the controller thereby causing a cutback in the blade path temperature reference generated by the block 556G.

When the controller 564G begins to function, the blade temperature reference generator 556G increases the blade path temperature reference at a predetermined rate for a predetermined time period, i.e. at a rate equal to a preset constant multiplied by the difference between the exhaust temperature reference and the exhaust temperature for 10 seconds. The preset constant is selected to match the blade path temperature reference ramp to the response to the exhaust thermocouples. The duration of the incrementation ramp period is preferably made adjustable. As the difference decreases, the incremental rate actions are repeated with a slower rate of blade path temperature increase each time until the actual exhaust temperature equals the temperature reference generated by the block 558G.

A low selector block 572G prevents the blade path temperature reference generated by the block 556G from exceeding 30°F above the temperature reference determined from the block 558G. Increased responsiveness of the control system is achieved by adjusting the 30°F absolute limit to a lower value empirically determined as a value just above a temperature value equal to the exhaust temperature limit value plus the actual temperature drop between the blade path and the exhaust path at the temperature limit of operation.

A hold monitor 574G compares the generated blade path temperature reference to the feedback blade path temperature output from a proportional plus derivative block 576G and it generates a hold on the reference generator once the feedback value reaches the blade path temperature limit. If the blade path temperature output from another proportional plus derivative block 580G reaches the temperature limit, a monitor block 578G causes the reference generator to run back the fuel demand. The derivative value in the runback channel is higher than the derivative value in the hold channel so that runback action is produced if the blade path temperature is approaching the limit value too fast relative to its spread from the limit value.

Figure 6C:
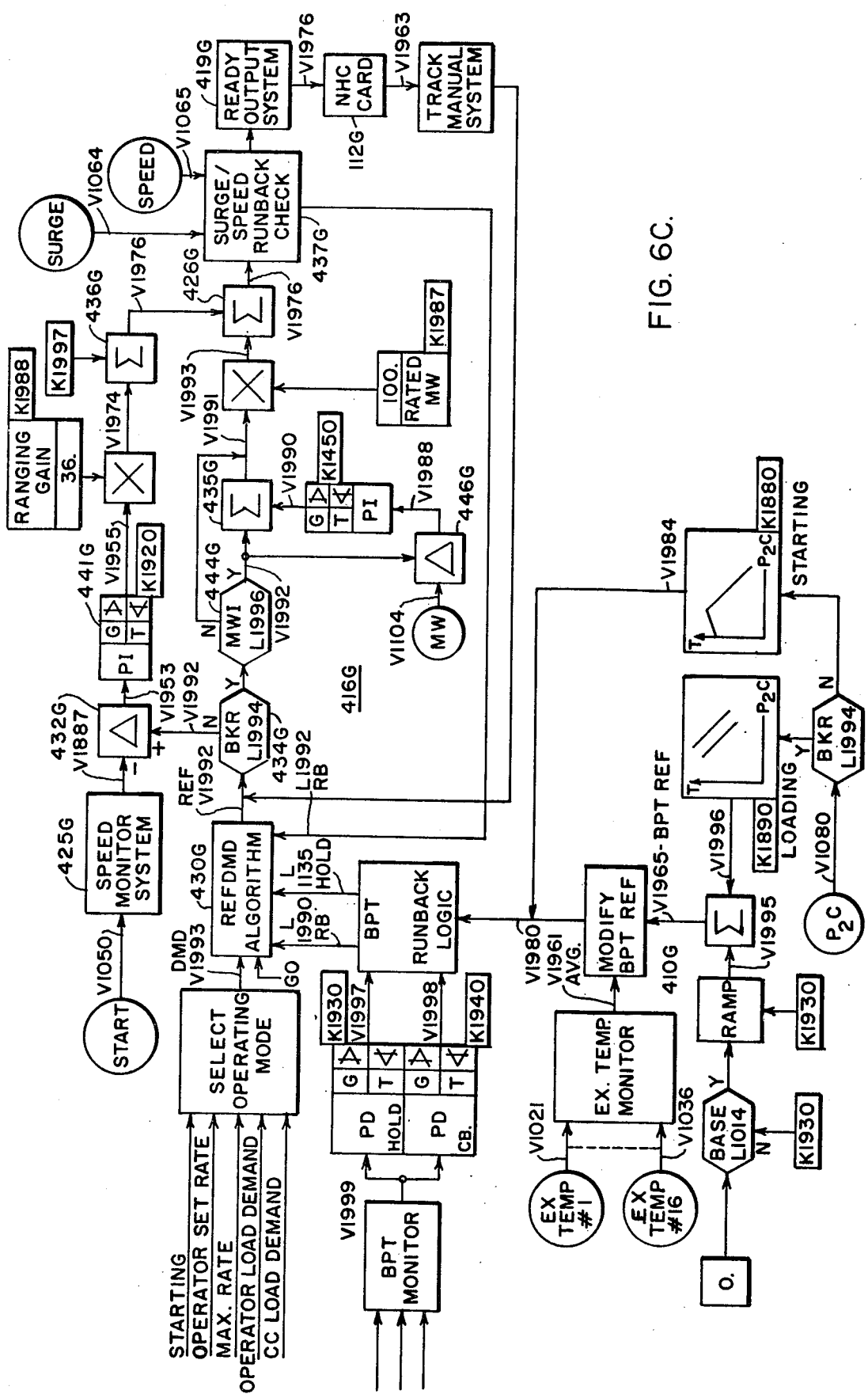
FIG. 6C shows another functional representation of the digital temperature control and the manner in which it is interfaced with other program elements in the gas turbine speed/load control system.

As shown in FIG. 6C, the hold and runback outputs from the digital temperature control are applied to a reference generator 430G in a turbine speed or load control loop to hold or cutback the turbine speed or load. The blade path feedback hold and cutback channels are respectively denoted by reference characters 543G and 545G in FIG. 6B. The startup blade path temperature reference is generated through channel 547G, and the loading blade path temperature reference is generated through channel 549G with exhaust temperature modification applied through channel 551G. Switch block 553G applies a peak bias to the temperature reference in summer block 555G if peak operation has been selected.

The reference generator 4350G functions in a digital fuel control 416G in the startup mode to generate a speed reference output which increases in accordance with a stored startup speed schedule. The reference generator output is applied to a difference or error block 432G in a speed control loop by a switching block 434G since the breaker is open during the startup mode. A speed feedback is also applied to the error block 432G by the speed monitor 425G. A proportional plus integral transfer function is applied to the output of the error block 432G by a controller block 441G and, after band limiting and range gain application, the resultant output is applied to the summer 426G. When the turbine 12 reaches the run standby state, the speed control responds to the actual speed feedback 425G and a synchronization speed setpoint generated by the reference generator 430G under the control of an external synchronizer to set the turbine fuel flow until the breaker is closed. Upon breaker closure, block 436G stores the existing fuel reference from the output of the speed controller 441G for continued application to the summer block 426G during the load mode of operation. During the startup period, hold or runback action on the reference generator results in a fuel hold or runback through speed loop operation.

In the load mode, the reference generator 430G functions in a megawatt load control system 400G and it generates an increasing MW reference output at a set rate to move toward an input MW load demand or setpoint. The switch block 434G applies the output of the reference generator 430G to another switch block 444G which either bypasses or inserts a load trim into the load control. If the load trim is bypassed, the forward load reference is applied directly to the summer 426G through a percent multiplier. If the load trim is selected for inclusion, a load trim is summed with the forward load reference in another block 435G and the sum is then applied to the summer 426G. In the trim control, a MW error is generated in block 446G from an MW feedback and the MW load reference and acted on by a proportional plus integral controller 448G to produce the load trim. In the summer block 426G, the load reference is added with the run standby or idle fuel reference for output from the computer 58G (FIG. 4A) as a feedforward fuel reference as indicated by V1976. During the load mode, hold or runback action on the reference generator results in a fuel hold or runback through load loop operation.

Block 437G checks the external surge limit signal and the external overspeed limit signal. If either is lower than the load reference, a runback is implemented through the reference generator 430G to make the load reference equal to the actual downstream fuel reference for bumpless resumption of load control when the limit action ends.

LOGIC AND CONTROL CHAINS AND ALGORITHMS

Figure 8A:
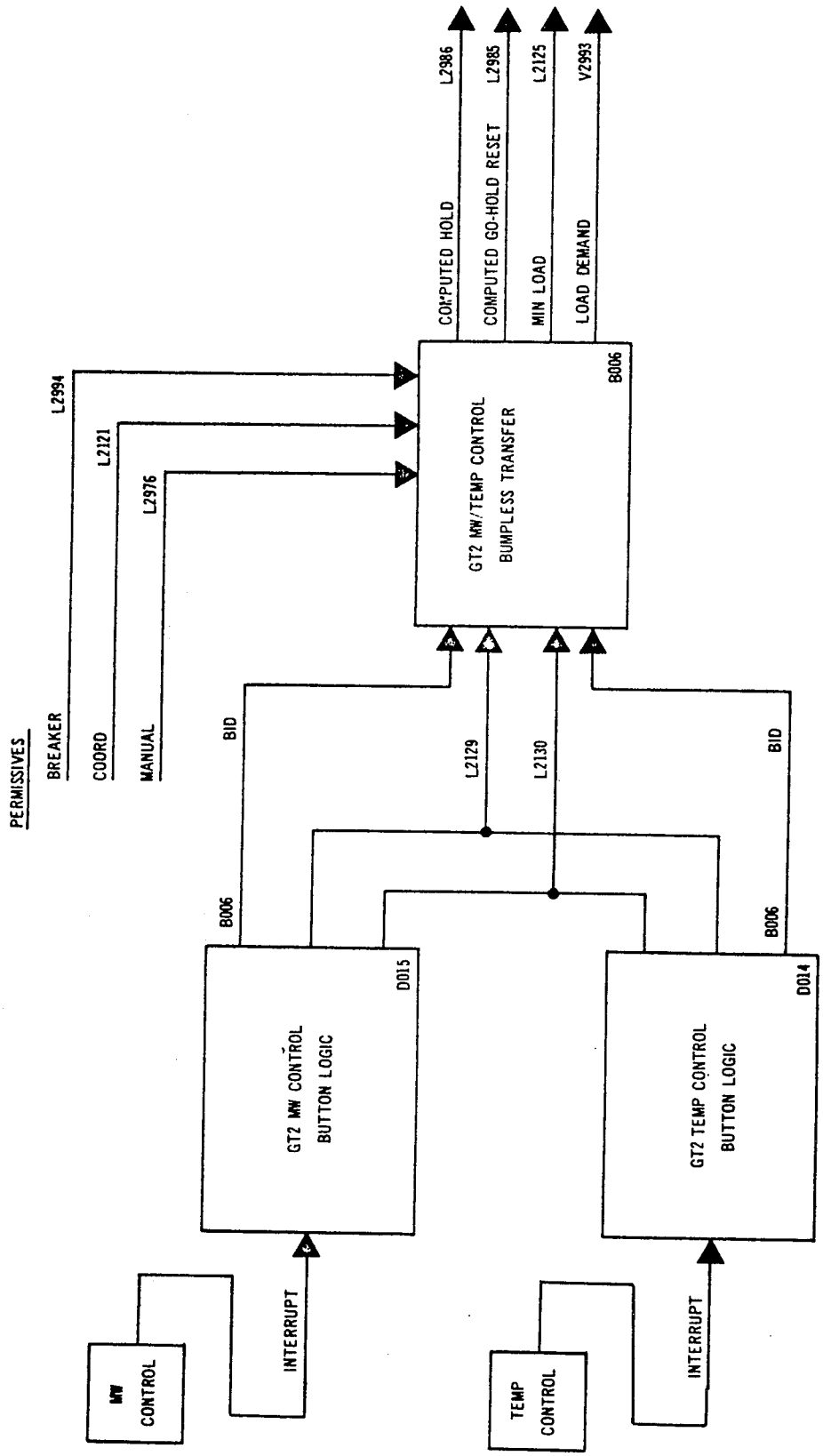
Figure 8C:
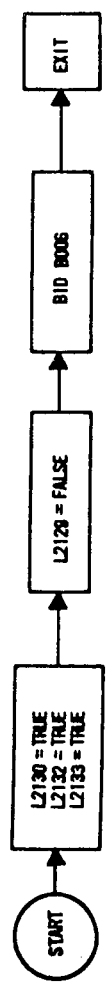

The following logic chains are similar for both gas turbines and are related to or included as part of the digital temperature limit control system:

a. B006 — GT2 MW/TEMP CONTROL BUMPLESS TRANSFER FIGS. 8A1-8A2

The MW/TEMP control bumpless transfer system responds to bids from the MW control button logic and the TEMP control button logic. When the MW control or the TEMP control buttons are pushed, the resulting software systems must enable the most recent of these buttons and disable the previous button. Thus at any time, under any circumstances, the operator may push the MW control button and be sure that he will see the proper bumpless transfer to MW control. Similarly he may push the TEMP control button and see the correct transfer.

The MW control button sets up the control computer system in such a way that, on automatic control and with the turbine generator on the line, the operator directs the MW demand with keyboard entries and with the use of the GO and HOLD buttons. The combined feedforward-feedback system then adjusts the fuel valve to produce the required generation. On manual control the computer tracking system follows the manual operation and prepares for a bumpless transfer to automatic MW control. During coordinated control the gas turbine is directed from the coordinating panel and the MW control button indicates that when the time arrives to reject from coordinated control to automatic control in such a situation the gas turbine comes back with the MW control mode operative.

The TEMP control button sets up the control computer system in such a way that, on automatic control and with the turbine generator on the line, the operator directs the MW demand to one of three targets: min load, base, or peak. In all other respects the computer takes care of the details of achieving these end points. Thus in TEMP control the keyboard and the GO and HOLD buttons cannot be used to set discrete turbine demands. On manual control the computer tracking system follows the manual operation and prepares for a bumpless transfer to automatic TEMP control. During coordinated control the gas turbine is directed from the coordination panel, and the TEMP control button cannot be selected. Rejection from coordinated to automatic control always returns in the MW control mode, from which the operator may easily go to TEMP control by pushing the TEMP control button.

The functional diagram indicates the interaction between the MW/TEMP control bumpless transfer system, the MW control button, and the TEMP control button. Both button logic systems result in a bid of the MW/TEMP control bumpless transfer, which in addition requires the proper state of permissive conditions involving the main generator breaker, manual operation, and coordinated control. Assuming that these permissives are in the proper state the MW/TEMP control bumpless transfer system positions the load demand to the correct value, depending on whether min load, base or peak is active, and sets the appropriate logical variables involving computed HOLD, GO HOLD reset, and min load to the correct state. This aligns the gas turbine computer control system to the resulting status requested by the MW and TEMP control buttons.

b. B007 – GT2 RUNBACK LOGIC FIGS. 8B1-8B2

The runback logic system responds to changes in state of the blade path temperature (BPT) and surge/speed runback conditions in the automatic control system. The BPT logical runback variable L2990 is set when the control computer senses BPT conditions above a variable reference. The surge/speed logical runback variable L2992 is set when the computer output to the fuel valve NHC card is above the analog system surge or speed controller settings. If either of the runback states occurs on automatic control, the gas turbine fuel valve reference is runback at an appropriate rate until the condition is cleared; then the runback logical variables are reset and the control computer again begins its normal control functions.

The functional diagram indicates that the runback variables L2990 and L2992 trigger execution of the runback logic, so that this chain runs only on demand when these variables change state. The diagram also shows that the main generator breaker acts as a permissive to the runback logic; in addition, bids are placed for the flame logic B00C and the auto sync logic B00A by thee runback logic softwear. These latter bids are required to enable or disable certain operating modes in the existence of a runback condition, and to recover properly after the runback ceases.

c. B00D – GT2 GO HOLD LOGIC FIGS. 8E1-8E2

The GO HOLD logic system responds to a number of conditions to the control computer system which require evaluation of the GO and/or the HOLD states. Primary among these are bids for execution of this GO HOLD logic issued by the GO button and the HOLD button logic systems. These bids are made when the operator pushes the GO or the HOLD button and certain preliminary criteria for validity of these buttons are satisfied. Then the GO HOLD logic examines the detailed situation with respect to GO and HOLD.

Bids for evaluation of the GO HOLD logic are also made from the fuel valve auto/manual logic system, from the main generator breaker logic system, and from the coordinated control system. These bids are placed mainly to turn off both GO and HOLD when the turbine rejects to manual control, when the main generator breaker opens, and when the gas turbine is placed in coordinated control. During each of these modes of operation, the GO HOLD logic system is not in service.

The GO HOLD logic is also triggered by computed logical variables internally within the control system. These variables consist of a computed HOLD, in which case the control system has concluded that conditions in the turbine require a hold on the fuel reference; and a computed reset of both GO and HOLD, in which case the control system has moved the turbine reference to the demand and therefore has accomplished the objectives of the GO HOLD system.

The functional diagram indicates the interrelationship between the GO HOLD logic system, the Go button, the HOLD button, and the various control system chains which bid the GO HOLD logic. Also shown is the permissive condition involving the temperature control mode, during which the GO and HOLD buttons are not operative. It is only during the MW control mode, when the operator directs the turbine from the keyboard on automatic load control, that GO and HOLD are validly used.

Finally, the GO HOLD logic system executes only on demand when its trigger variables change state, when the GO or HOLD are pushed, or when turbine operating conditions are such as to require bids of the GO HOLD logic to reject both GO and HOLD due to manual, coordinated, or speed control.

d. D014 – GT2 TEMP CONTROL BUTTON LOGIC FIG. 8A1

The TEMP control button logic responds to the operator pushing the TEMP control button on the gas turbine BTG board. Normally, this button functions on automatic load control, when the main generator breaker is closed. It allows the operator to select either min load, base, or peak as the turbine MW demand. The computer control system then immediately begins to adjust the turbine reference to meet the demand at the rate selected by the operator. There is no requirement for keyboard entires or use of the GO and HOLD buttons; in fact, these are invalid during the temperature control mode, with the computer ignoring GO and HOLD and flashing the cancel lamp if the keyboard is used to attempt a load demand entry. The combined feedforward-feedback computer control system adjusts the fuel valve and the inlet guide vane to yield generated MW's equal to reference MW's as reference moves toward min load, base, or peak.

The functional diagram indicates the interaction between the TEMP control button, the MW control button, and various permissive conditions required for each. When the TEMP control button is pushed the BTG board hardware circuitry generates as interrupt, which is received and decoded by the control computer. The software operating system identifies the interrupt and bids this TEMP control button logic, which in turn performs the proper logical manipulations to enable TEMP control, disable MW control, and bid the MW/TEMP control bumpless transfer chain.

The functional diagram indicates the cross-coupling effect of the TEMP control and the MW control buttons. Pushing one of these enables itself and disables the other. This can be done at any time, under any operating circumstances, with the MW/TEMP control bumpless transfer system taking care of the various situations depending on existing turbine and BTG board conditions.

e. D015 – GT2 MW CONTROL BUTTON LOGIC FIG. 8A1

The MW control button logic responds to the operator pushing the MW control button on the gas turbine BTG board. Normally, this button functions only on automatic load control, when the main generator breaker is closed; it allows the operator to enter the turbine MW demand from the keyboard. The control computer system then adjusts the turbine reference to meet the demand at the rate selected by the operator, with the GO and HOLD buttons functioning to allow the operator to jog or maneuver the reference, depending on operating conditions. The combined feedforward-feedback computer control system then adjusts the fuel valve and the inlet guide vane to yield generated MW equal to the reference MW, while maintaining the turbine metal temperatures within design limits.

The functional diagram indicates the interaction between the MW control button, the temperature control button, and various permissive conditions required for each. When the MW button is pushed the BTG board hardware circuitry generates an interrupt, which is received and decoded by the control computer. The software operating system identifies the interrupt and bids the MW control button logic which, in turn, peforms the proper logical operations to enable MW control, disable temperature control, and bid the MW/TEMP control bumpless transfer chain.

The functional diagram indicates the cross-coupling effect of the MW control and the TEMP control buttons. Pushing one of these enables itself and disables the other. This can be done at any time, under any operating conditions, with the MW/TEMP control bumpless transfer system taking care of the various situations depending on existing turbine and BTG board circumstances.

f. D05E – GT2 BASE/PEAK BUTTON LOGIC FIGS. 8F1–8F2

The BASE/PEAK button logic responds to changes in state of contact inputs which correspond to the BASE and the PEAK buttons on the gas turbine BTG board. These buttons set upper blade path temperature (BPT) limits to which both the analog and the digital control systems respond. In base operation the limit is computed from a curve relating blade path temperature to combustor shell pressure (P2C), while in peak operation a higher limit, usually about 50°F, is computed and used in the analog and the digital control systems.

The BASE and PEAK buttons are each wired directly to the analog control center, which then retransmits these logical states to the control computer as contact inputs. Change of state in these contacts then trigger execution of this BASE/PEAK button logic; thus this control chain runs only on demand when the BASE or PEAK buttons are pushed.

The functional diagram indicates that a number of permissive conditions must be satisfied before the control computer takes action as a result of the BASE and PEAK buttons. Thus the turbine must be on automatic control with the main generator breaker closed in order to allow the digital control system to react to these buttons. In addition, if the gas turbine is in the temperature control mode, then the turbine MW demand will immediately be raised to the base or peak level, and the automatic control system will begin to adjust the reference to this new value.

Figure 7A:
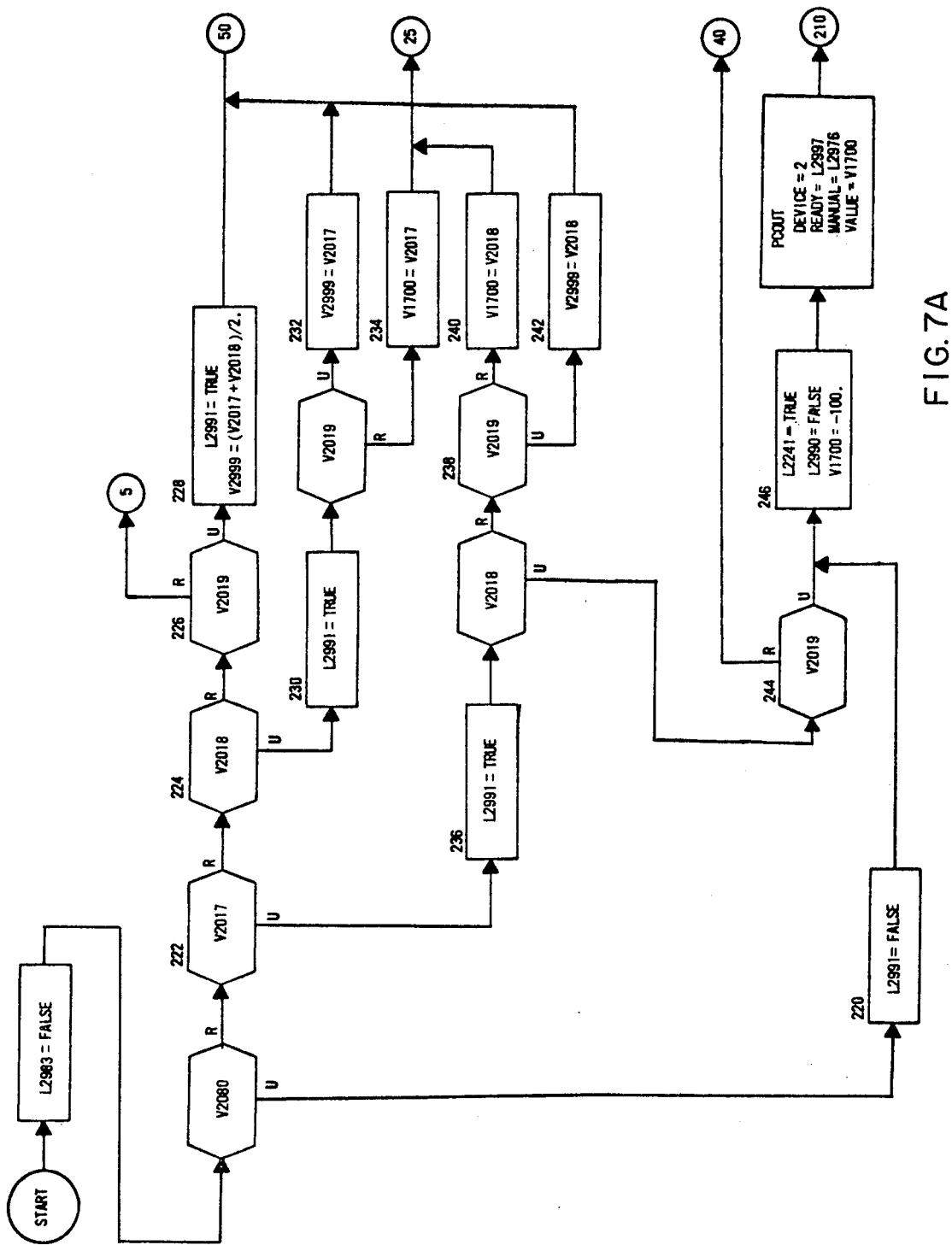
Figure 7B:
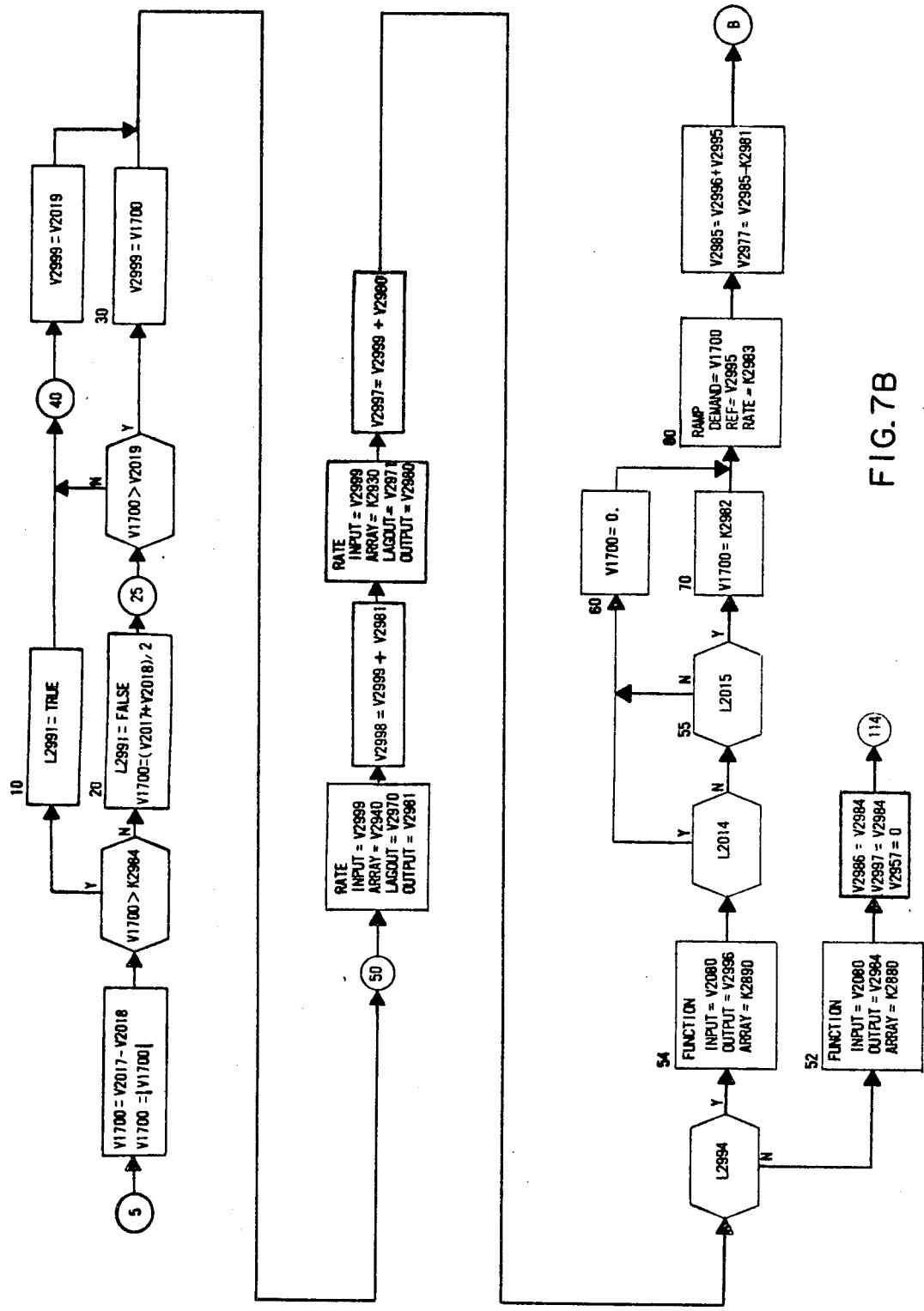
Figure 7C:
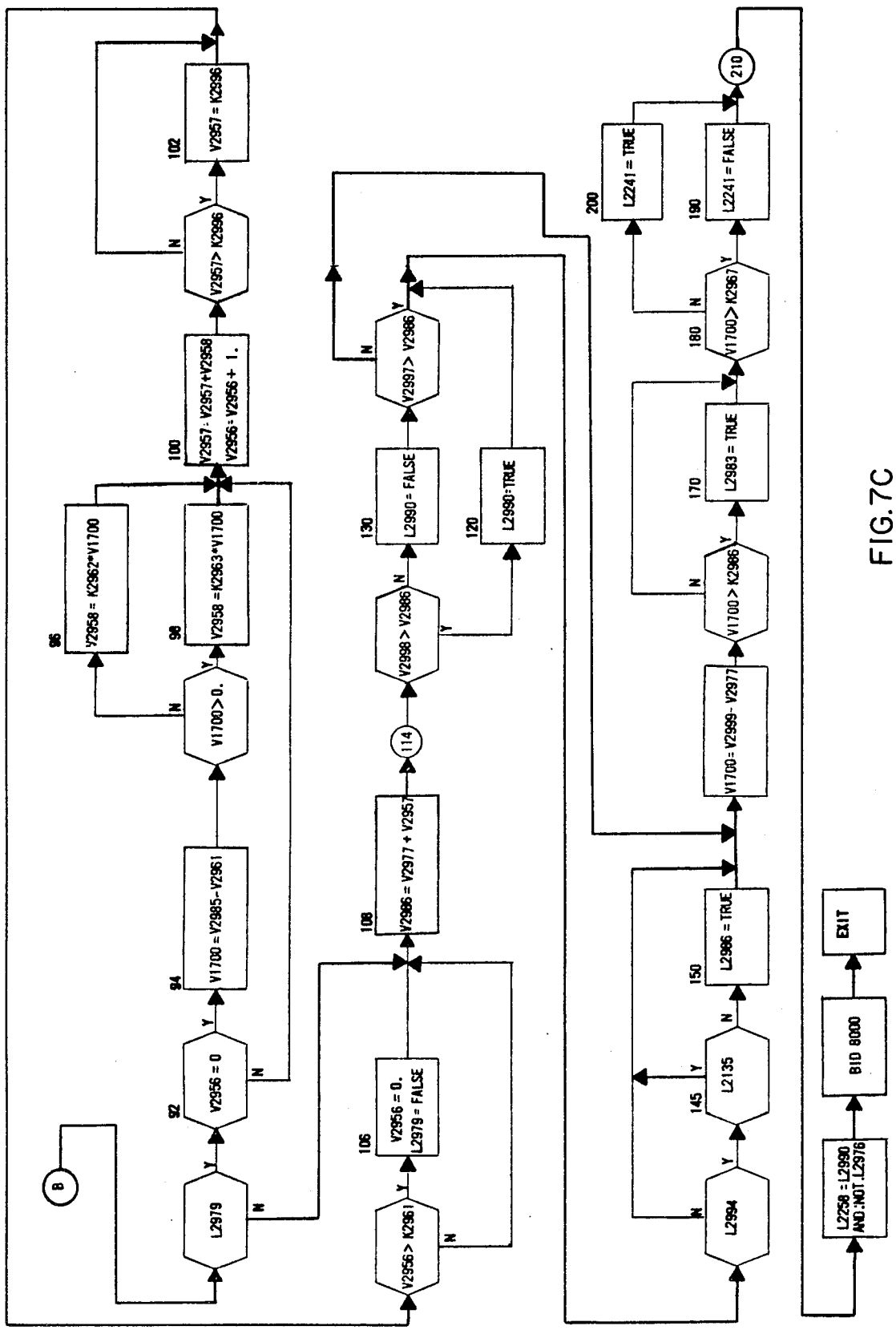
Figure 7D:
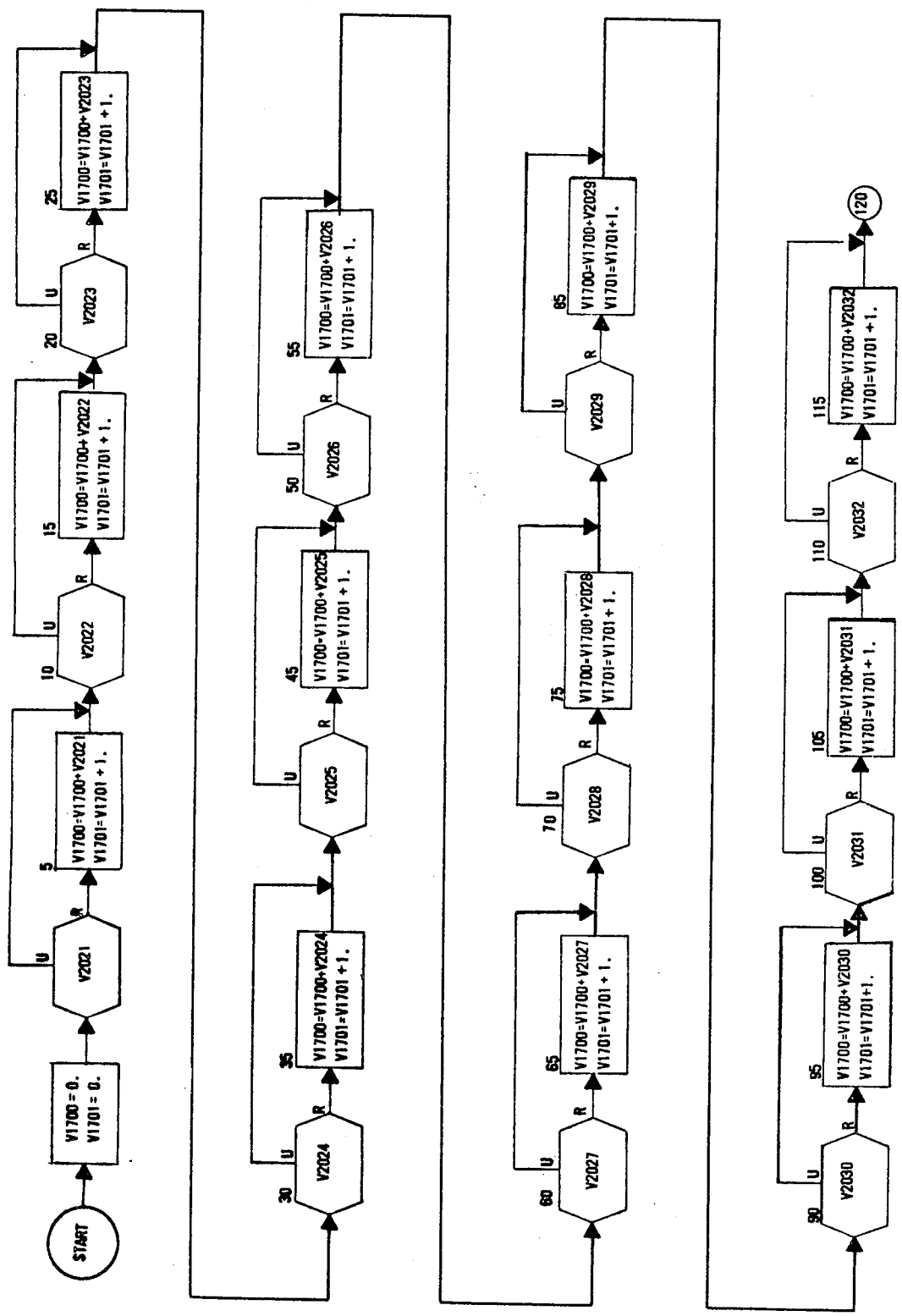
Figure 7E:
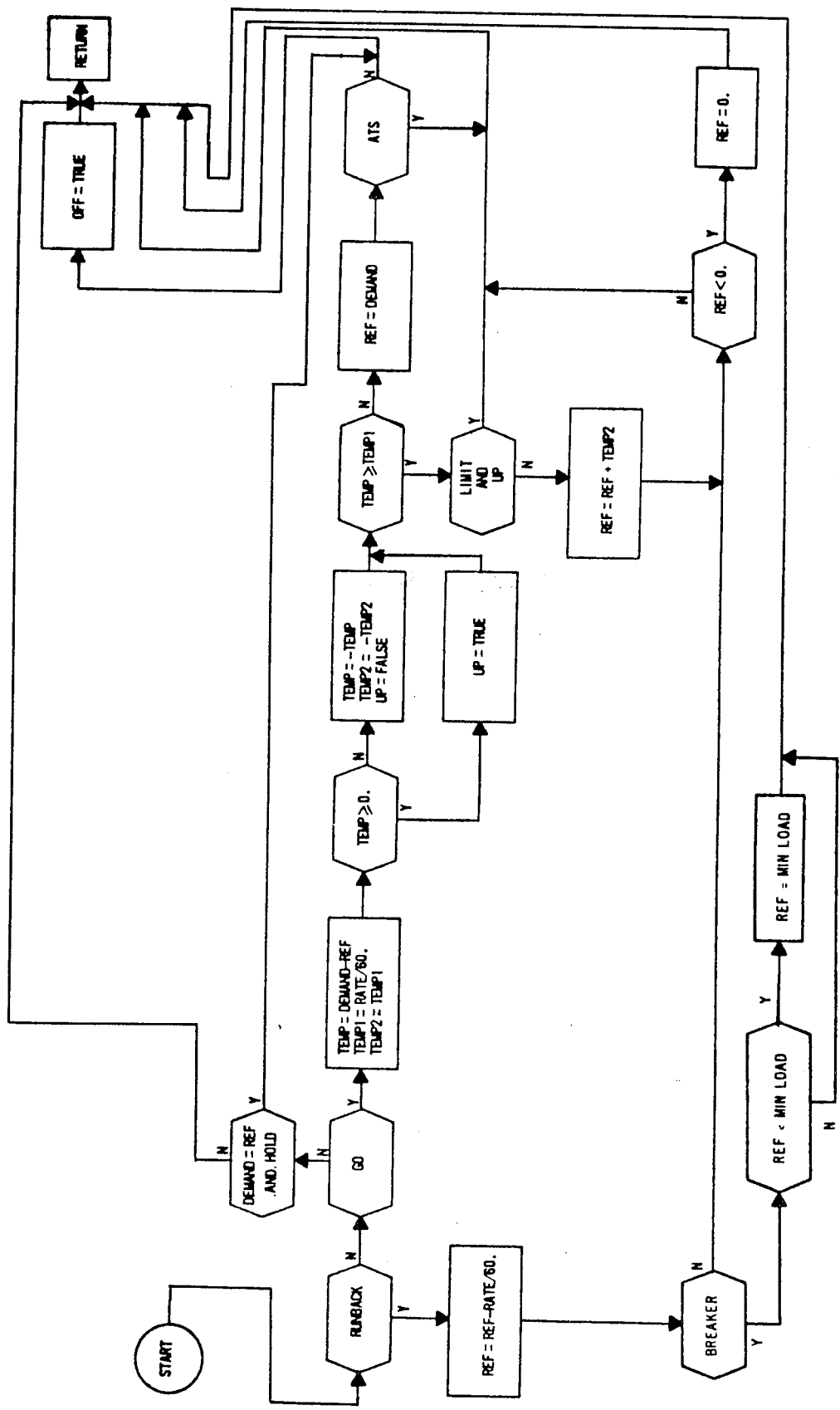
Figure 7H:
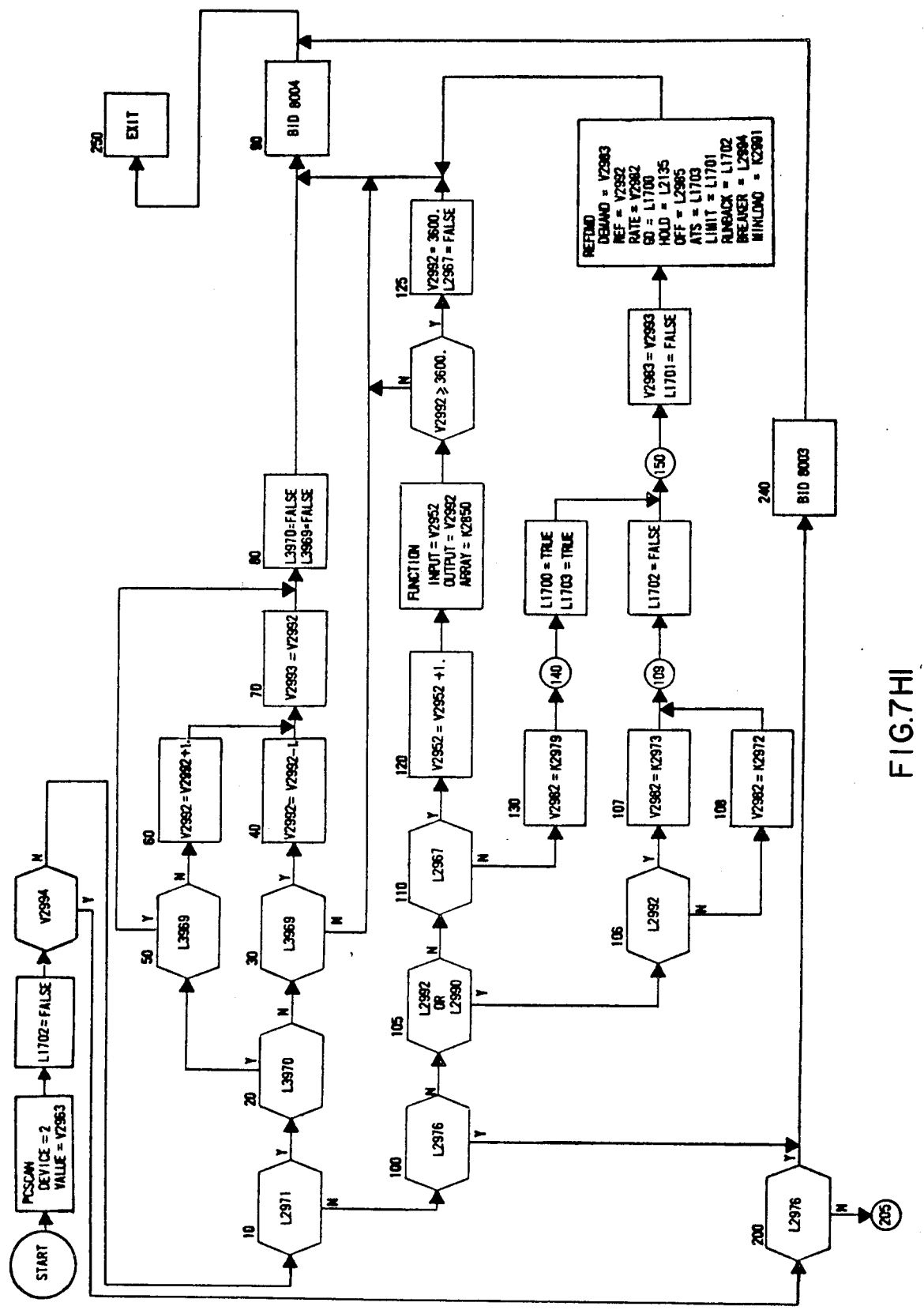

The following algorithms are employed as shown in FIGS. 7A through 7H2:

a. REFDMD — REFERENCE/DEMAND CONTROL

The REFDMD algorithm provides the PACE control computer system with a controller which moves a turbine or plant reference toward a targeted demand. The algorithm includes additional features to handle runback situations and to manipulate logical variables which, in turn, operate boiler-turbine-generator (BTG) board lamps. REFDMD is normally executed periodically, once a second, by various control system chains.

The operating philosophy of the entire PACE computer control system is based on a reference-demand concept. The demand variable respresents a target to which any turbine or the entire plant is set. This may be a speed demand in rpm during wide-range speed control, or it may be a load demand in megawatts during load control. The mechanism for setting the target demand varies with the operating mode of the turbine or plant. During automatic control, for example, the demand may be entered from a keyboard by the operator, or it may be internally computed by control system software. During coordinated control the plant demand is set by the operator from a keyboard, but the various turbine demands are computed by the coordination system. During manual control, the demand is internally computed by software which is continually tracking the manual operation in preparation for bumpless transfer to automatic control.

The reference variable represents the actual turbine or plant condition on a second-by-second basis. The reference is always moving toward the demand at a rate which depends on the operating mode of the turbine or plant. During automatic control the rate, in rpm per minute or MW per minute, may be entered by the operator from a keyboard, or it may be computed by internal software. During coordinated control the operator sets the plant load rate, but the coordination system computes the individual turbine rates. During manual control the rate is internally set by software which tracks continuously the manual operation in preparation for bumpless transfer to automatic control.

The REFDMD algorithm provides the control computer with the ability to accomplish this reference-demand philosophy. It maneuvers reference at the appropriate rate, responds to runback situations, does the bookkeeping to properly terminate software when reference equals demand, and generates logical signals to place GO and HOLD lamps in appropriate states.

A program using the REFDMD algorithm requires identification of eleven arguments, as follows:

```
REFDMD
        DEMAND = VXXXX
        REF = VXXXX
        RATE = KXXXX
        GO = LXXXX
        HOLD = LXXXX
        OFF = LXXXX
        ATS = LXXXX
        LIMIT = LXXXX
        RUNBACK = LXXXX
        BREAKER = LXXXX
        MINLOAD = KXXXX
DEMAND  — A V number containing the target demand to be
          achieved by the REFDMD algorithm.
REF     — A V number containing the reference which is to
          be maneuvered by REFDMD to reach demand.
RATE    — A V number containing the rate at which REFDMD
          is to move REF toward demand.
GO      — An L number indicating the status of the GO
          button and lamp. When GO is set true, REFDMD
          moves REF toward demand, when GO is reset false
          REFDMD does not move REF.
HOLD    — An L number indicating the status of the HOLD
          button and lamp. When HOLD is set true, REFDMD
          will not move REF, and will turn off HOLD if
          REF and demand are equal. When HOLD is reset
          false, REFDMD takes no action as far as HOLD is
          concerned.
OFF     — An L number indicating the status to be used in
          turning off GO and HOLD. When REFDMD finds REF
          and demand equal, it sets off true; this triggers
          a control system chain which turns off both the
          GO and HOLD lamps.
ATS     — An L number indicating the status of the
          automatic turbine startup (ATS) software, which
          provides supervision of the steam turbine
          portion of the PACE plant. When ATS is set
          true, the REFDMD algorithm does not turn off the
          GO and HOLD lamps, since these are not operable
          in the ATS mode. When ATS is reset false,
          REFDMD takes no action as far as ATS is
          concerned.
LIMIT   — An L number which indicates the status of the
          valve position limit of the steam turbine
          computer control system. This is a special
          logical system which does not allow the steam
          turbine control valves to be raised above an
          adjustable setpoint. When REFDMD finds limit
          set true and REF is attempting to move up towards
          demand, REFDMD does not raise REF until the
          limit condition is reset. When limit is set
          true and REF is attempting to move down toward
          demand, REFDMD allows REF to decrease. When
          limit is reset false, REFDMD takes no action as
          far as limit is concerned.
```

RUNBACK — An L number which indicates a contingency status. If runback is set true, REFDMD lowers REF at the rate value; should the breaker on the unit be closed the runback stops at minimum load, while the runback continues to zero if the breaker is open.

BREAKER — An L number indicating the breaker state. This argument is used only when the runback state is set; then for a closed breaker status, the runback proceeds only to minimum load.

MINLOAD — A K number indicating the minimum load which can be requested on the turbine. REFDMD uses this argument only if a runback occurs and the main generator breaker is closed.

The REFDMD algorithm first checks the runback; argument; if it is true, the reference is decreased by the amount of rate (divided by 60 to convert units per minute to units per second). If the breaker is closed, the new value of REF is compared with minload. Should REF be smaller than minload, REF is then set equal to minload; if REF is greater than or equal to minload, the algorithm exits.

Should runback be false, REFDMD checks the state of the GO argument. If GO is false, another check is made on the equality of REF and demand. Should these be equal and the HOLD lamp be on, the off argument is set true. This triggers another control system chain which turns off both the HOLD and GO lamps. If REF and demand are not equal when go is false, REFDMD simply exits.

If GO is true, then the difference between demand and REF is computed and placed in temperature, and rate is divided by 60 to convert it to units per second, and is placed in both TEMP1 and TEMP2. The value of temperature is then checked against zero; if temperature is greater than zero, demand is greater than REF and the reference must be increased. Therefore an internal logical variable up is set true. If temperature is less than zero, demand is less than REF and the reference must be decreased. Therefore the internal logical variable up is made false and the algebraic sign of temperature and TEMP2 reversed.

Temperature has a positive sign as a result of the above tests, so that it represents the magnitude of the difference between demand and REF. The magnitude in temperature is compared against TEMP1, which contains the size of the step change to be made in REF this second. (This is the result of dividing rate which is in units per minute by 60 to yield units per second, the step change each second.) If temperature is greater than TEMP1, REF is greater than one step from demand; in this case, the VPLIM argument is checked to see if it is true while REF is going up. If so, the reference is at such a level as to cause a valve position limit situation; therefore, REF may not be increased and REFDMD exits at this point.

If there is no valve position limit, the increment in TEMP2 (which now has proper polarity to raise or lower REF as described in the above paragraphs) is algebraically added to the current value of REF. A test is made to determine if this addition has made REF less than 0. If so, REF is set to zero; otherwise REFDMD exits.

If the magnitude test on temperature versus TEMP1 shows that temperature is equal to or less than TEMP1, the value of reference is within one step size of demand. REF is made exactly equal to demand, and a test made on the state of the ATS argument. If it is false, off is set true; this then triggers a special control system chain which turns off both GO and HOLD lamps, after which REFDMD exits, if the ATS argument is true, REFDMD exits immediately since GO and HOLD lamps are not functional in the ATS control mode.

b. RAMP — RAMP CONTROLLER

The RAMP algorithm provides the PACE control computer system with a controller which ramps an output variable at a linear rate toward an input variable. A sketch of a typical ramp waveshape is shown on the flow chart. The RAMP algorithm is normally executed periodically, once a second, by various control system chains. Its most common use is in tracking schemes, where the ramp function contains the mismatch between a manual system and the automatic system. When control is switched to automatic, a bumpless transfer takes place and the mismatch is slowly removed at a controlled rate by the ramp controller. The RAMP algorithm is also used in situations where switching occurs under normal operating conditions; an example is the change from base to peak operation of the gas turbines, during which a higher operating temprature bias is gradually entered into the control system through the RAMP algorithm.

A program using the RAMP algorithm requires identification of three arguments, as follows:

RAMP
　　　　　DEMAND = VXXXX
　　　　　REF = VXXXX
　　　　　RATE = KXXXX

DEMAND — A V number containing the input to the RAMP algorithm; demand represents the ultimate output or target of the ramp controller.

REF — A V number containing the output of the RAMP algorithm, REF will approach demand at a linear rate.

RATE — A K number containing the linear rate at which REF is to approach demand. Rate normally has dimensions of units per minute, such as degrees per minute or percent per minute. The algorithm internally converts these to units per second, since the control system normally executes once per second.

The RAMP algorithm first computes the difference between the input demand and the output REF and checks whether this is zero; if so the algorithm exits. If not, the rate is divided by 60 to compute the incremental change to be made in REF on a per-second basis, and then this is saved in temporary locations. The non-zero difference between demand and REF is next examined for algebraic sign to determine whether REF has to be raised or lowered in its linear approach to demand. If the difference is negative, the polarities of the temporary locations are reversed, since this indicates REF must decrease to reach demand.

Next the difference between demand and REF, which by now has been converted to a magnitude by the sign operations described above, is compared with the incremental step change computed from rate. If the difference is greater than the increment, the increment is algebraically added to REF and the algorithm exits. If the difference is less than the increment, this means that REF is within one increment of demand; therefore, the RAMP algorithm sets REF exactly equal to demand and then exits.

The following control chains are similar for both gas turbines and are related to or included as part of the digital temperature limit control system:

a. 8001 — GT2 BLADE PATH EXHAUST TEMPERATURE CONTROL

The blade path exhaust temperature control calculations and checks are performed in chain 8001. Prior to doing any calculations, the chain checks the reliability of the input variables it will use such as combustion shell pressure and blade path temperature averages 1, 2 and 3. If the pressure reading is found to be unreliable, the chain sets an appropriate alarm bit and immediately exits, but if a temperature average is found to be unreliable the program sets an alarm logical variable and forms an average of the remaining good temperature readings; however, should no temperatures be reliable, the chain again sets an appropriate alarm bit and exits. The temperature input used in the following calculations is an average of all the reliable readings.

Having found enough reliable inputs to perform its calculations, the chain first calculates two temperature signals which are equal to the calculated average temperature plus the output of two rate blocks. These are called the runback and hold signals. Having calculated these runbacks and hold temperature signals, the program now proceeds to calculate a temperature reference.

Before calculating a temperature reference the program checks the logical variable for the breaker status to determine if the breaker is open or closed. If the breaker is closed, a starting temperature reference is calculated as a function of combustor shell pressure and the program proceeds to label 114. If the breaker is closed indicating that the gas turbine is generating load, an appropriate load temperature reference is generated. The load temperature reference is formed by first generating a base load temperature reference as a function of combustor shell pressure. A check is then made to see if peak load was selected through the operator's panel peak button, and if this is so, a temporary variable is set equal to the difference between the base load temperature reference and the peak load temperature reference. If either base has been selected or if no selections were made, the temporary variable is set to zero. This temporary variable becomes the demand point for a ramp generator which moves its output toward this value. The ramp generator output is, in turn, added to the base load temperature reference previously generated. Thus, the offset is slowly ramped between base and peak preventing sudden jumps in the reference level.

Having formed a reference, the chain proceeds to check the logical variable L2979 to see if blade path temperature control has been selected, and if so a check is made to see where the actual temperature is in relation to the previously generated reference and an appropriate ramp rate is calculated as a function of this difference so that fuel will move in a direction so as to eliminate the error.

Before exiting the chain, check for the existence of hold and runback conditions by comparing the hold and runback signals against the temperature reference. If either the hold or the runback signal exceed the temperature reference, the appropriate hold or runback flag is set providing that certain conditions exist such as: that there are not already existing holds or runbacks or that, in the case of the hold, the generator breaker has been closed. The chain then checks to see whether the temperature has exceeded alarm or trip limits. If either is exceeded, the appropriate action is taken. In the case of an alarm limit an alarm logical variable is set true; in the case of a trip being exceeded the trip logical variable is set true. These will be acted later upon by other chains. The blade path exhaust temperature control chain 8001 ends with a bid for the IGV control chain 8000.

b. 8007 — EXHAUST TEMPERATURE MONITOR

Multiple gas turbine exhaust temperature readings are checked for reliability and averaged for use in the blade path temperature control chain. The temperature representations V2021 through V2036 are checked for reliability and all reliable values are added together in the first 34 steps of the chain execution. Next, a check is made to determine whether at least one temperature representation has been reliable, i.e. whether V1701 is equal to zero. If so, the exhaust temperature unreliable logical is set true and the exhaust temperature control is inactivated.

If one or more reliable exhaust temperature values have been recorded, the average value V2961 is calculated and then subtracted from the blade path temperature hold limit. When the temperature difference reaches a preset value K2971, the exhaust temperature control is activated by setting L2979 true.

c. 8005 — SELECT OPERATING MODE

In the operating mode selection chain, the speed and load references are generated according to the mode of plate or turbine operation. If the gas turbine is on manual fuel valve operation as indicated by the logical variable L2976, the track manual chain 8003 is bid and the select mode chain 8005 is ended. If automatic digital fuel control is operative, the flow chart path depends on whether the turbine is in wide range speed control, the synchronization process, or load control.

If the breaker is open as indicated by the variable V2994, the turbine is in wide range speed control. In turn, the variable L2967 indicates whether the turbine is under automatic startup speed control and if it is, the time V2952, which starts at the time point of flame on, is advanced by one second and the speed reference V2992 is determined from the stored speed-time curve K2850. If synchronous speed has not yet been reached, the speed/load chain 8004 is then bid to put the new speed reference in the integrator speed control loop and lift the turbine fuel flow to produce an actual turbine speed equal to the speed reference. When the turbine reaches synchronous speed, i.e. when the speed curve time has expired at 720 seconds, auto start L2967 is set false and the reference V2992 is set equal to 3600 rpm for manual or automatic synchronization.

On automatic synchronization, the variable L2971 is true and reference V2992 is set equal to its last value plus or minus 1 rpm according to whether a raise pulse or a lower pulse has been received from the external automatic synchronizer. Further, the demand V2993 is set equal to the new reference and the speed/load chain 8004 is bid to boost or lower the turbine speed by 1 rpm.

If the turbine is on manual synchronization, the auto start variable L2967 is false and the reference change rate V2982 is set equal to a stored manual sync acceleration rate V2982 which can be 1 rpm per second. In manual synchronization, the operator cannot override the reference change rate. The GO and ATS variables L1700 and L1703 are set true, the algorithm REFDMD outputs a changing reference V2992 according to the manual sync rate on and the speed/load chain 8004 is bid. As turbine speed changes and a line match occurs, the operator closes the breaker. If the turbine speed crosses the line speed without breaker closure, the operator puts in a new speed reference which will cause a recrossing of the turbine and line speeds or frequencies.

If a blade path temperature, surge or speed runback exists as indicated by L2992 or L2990, the reference change rate V2982 is made equal to the surge/speed runback rate K2973 or the BPT runback rate K2972, automatic start is bypassed, and the REFDMD algorithm generates the speed reference in accordance with the runback rate. Next, the speed/load chain 8004 is bid to change the turbine speed in accordance with the speed reference runback.

In load control, a runback similarly causes the load reference change rate to be set equal to the surge/speed load runback rate K2995 or the BPT load runback rate K2975. The REFDMD algorithm then implements the load reference runback.

In normal load operation without plant coordination, the load change rate V2982 is set equal to the operator selected load rate V2994 and a check is made to make sure the operator load demand is at least equal to minimum load. If temperature control L2130 is not selected, the algorithm REFDMD generates a load reference V2992 in accordance with the operator load demand V2993 at the operator load rate V1974. The speed/load chain 8004 is bid to operate to change the turbine fuel flow in accordance with the new load demand.

In coordinated control, the load demand and rate are made equal to V2979 and V2978 which are generated at the coordinated control level. If the temperature change rate L5056 is excessive, the rate V2982 is made zero. The rate is also made zero in noncoordinated control, i.e. operator automatic control, if the digital temp control becomes limiting in load control as indicated by the variable L2130. As in other cases, the algorithm REFDMD generates the reference in accordance with the coordinated load demand and the coordinated rate or the temperature limiting rate.

In cases where it is desired to provide fixed time startup even though a hold or runback occurs, the select operating mode flow chart is modified as preferably indicated in the flow chart for chain 8005-A. Generally, this flow chart only shows the additional functions needed to provide time makeup. Thus, on a hold or runback, the acceleration timer continues to count, and on release of the hold or runback, a new rate schedule, i.e. a higher speed curve slope is executed until the time is made up or until 3400 rpm at which time the normal speed curve slope applicable at that value is employed to enable stable transition through bleed valve closing and synchronization. In this embodiment, the hold or runback time is only partly made up if it is not made up by the time the turbine reaches 3400 rpm.

d. 8004 — SPEED/LOAD CONTROL

Chain 8004 contains controllers to adjust the gas turbine fuel to attain a desired speed or load setpoint. In order to determine whether speed or load control is selected, the chain first checks the breaker logical variable L2994. If the breaker is open, a speed control path is taken where a speed error is formed by subtracting the actual speed from the speed reference. This error is then fed into a proportional plus integral controller with limits, the output of which is ranged to the proper magnitude for output later to the throttle valve. When the breaker closes the last value of this throttle valve output, i.e. the idle fuel reference, is stored for later addition to the load fuel reference value.

If the breaker is found to be closed it means that the gas turbine is on line generating power and therefore in a loading mode. A check is then made to see if megawatt control has been selected and, if not, the reference from the reference demand REFDMD block is fed forward for summation with the last speed controller output after proper ranging for the throttle valve. This reference is under the control of other chains such as the blade path exhaust temperature control chain 8001 when megawatt control is not active.

If megawatt control is active, a path is taken through the feedforward plus trim megawatt control calculations. In this path the error between the megawatt reference and the actual generated megawatts is calculated and fed to a proportional plus integral control block with limits and its output is then summed with the original reference and ranged for the throttle valve. The resulting ranged signal is then summed with the idle fuel reference before being stored for later output.

At label 200 the speed and load control paths rejoin and the calculated throttle valve signal is checked against the external hardware surge and speed controller outputs providing that the readings of these signals have been found reliable. If the throttle valve signal as calculated by the speed or load controller exceeds either of the two limits, hold or runback logical flags are set provided the proper conditions exist.

Beginning at label 230 the chain checks actual generated megawatts against various load megawatt levels to determine if the gas turbine is at minimum, base or peak load. The appropriate logical variables are then set true for output as status lights on the operator control panel and for use by other chains. Chain 8004 exits after bidding for the Ready/Output chain 8002.

INDEX OF VARIABLES FOR DRAWINGS

FIG 7A

| | | |
|---|---|---|
| | V2017 | BLADE PATH T. GROUP1 AVG. |
| | V2018 | BLADE PATH T. GROUP2 AVG. |
| | V2019 | BLADE PATH T. GROUP3 AVG. |
| | V2080 | COMP. DISCH. PRESS. P2C |
| | V2999 | BPT CONTROL SIGNAL |
| | V2998 | BPT RUNBACK SIGNAL |
| | V2997 | BPT HOLD SIGNAL |
| | V2996 | P2C LOAD-CHARACTERIZED BPT |
| | V2955 | BASE/PEAK BPT BIAS RAMP |
| | V2986 | BPT RUNBACK LIMIT |
| | V2985 | BPT HOLD LIMIT |
| | V2984 | P2C SPEED-CHARACTERIZED BPT |
| | V2970 | DELAYED BPT-HOLD CONTROLLER |
| | V2971 | DELAYED BPT-RUNBACK CONTROLLER |
| | V2961 | EX.TEMP. CONTROL SIGNAL |
| | V2956 | EX.TEMP. TIMER |
| | V2957 | Ex. TEMP. RAMP |
| | V2958 | EX. TEMP. RAMP RATE |
| | V2977 | BPT BIASED REF |
| | L2991 | BPT OR P2C UNRELIABLE |
| | L2990 | BPT RUNBACK |
| | L2994 | BREAKER FLIPFLOP |
| | L2014 | BASE BUTTON Cl |
| | L2015 | PEAK BUTTON Cl |
| | L2135 | HOLD LAMP |
| | L2986 | COMPUTED HOLD |
| | L2983 | BPT HIGH ALARM |
| | L2241 | BPT NOT TRIPPED CO |
| | L2979 | EX. TEMP. CONTROL ACTIVE |
| | L2258 | TEMP. CONTROL MONITOR LAMP |
| | K2984 | BPT DEADBAND |
| | K2983 | BASE/PEAK RAMP RATE |
| | K2982 | BPT PEAK OFFSET |
| | K1981 | BPT RUNBACK DEADBAND |
| | K2986 | BPT HOLD DEADBAND |
| | K2967 | BPT TRIP LEVEL |
| | K2962 | BPT/EX. TEMP. NEGATIVE RATE |
| | K2963 | BPT/EX. TEMP. POSITIVE RATE |
| | K2961 | EX. TEMP. MAX. TIME COUNT |
| | K2890 | P2C-BPT LOADING ARRAY |
| | K2800 | P2C-BPT STARTING ARRAY |
| | K2940 | BPT RUNBACK CONTROL ARRAY |
| | K2930 | BPT HOLD CONTROL ARRAY |
| | K2985 | BPT REF BIAS |
| | K2996 | MAX EX. TEMP RAMP |
| | 8000 | INLET GUIDE VANE CONTROL |

FIG. 7B

| | | |
|---|---|---|
| | V2017 | BLADE PATH T. GROUP1 AVG. |
| | V2018 | BLADE PATH T. GROUP2 AVG. |
| | V2019 | BLADE PATH T. GROUP3 AVG. |
| | V2080 | COMP. DISCH. PRESS. P2C |
| | V2999 | BPT CONTROL SIGNAL |
| | V2998 | BPT RUNBACK SIGNAL |
| | V2997 | BPT HOLD SIGNAL |
| | V2996 | P2C LOAD-CHARACTERIZED BPT |
| | V2995 | BASE/PEAK BPT BIAS RAMP |
| | V2986 | BPT RUNBACK LIMIT |
| | V2985 | BPT HOLD LIMIT |
| | V2994 | P2C SPEED--CHARACTERIZED BPT |
| | V2970 | DELAYED BPT-HOLD CONTROLLER |
| | V2971 | DELAYED BPT-RUNBACK CONTROLLER |
| | V2981 | EX. TEMP. CONTROL SIGNAL |
| | V2956 | EX. TEMP. TIMER |
| | V2957 | EX. TEMP. RAMP |
| | V2958 | EX. TEMP. RAMP RATE |
| | V2977 | BPT BIASED REF |
| | L2991 | BPT OR P2C UNRELIABLE |
| | L2990 | BPT RUNBACK |
| | L2994 | BREAKER FLIPFLOP |
| | L2014 | BASE BUTTON Cl |
| | L2015 | PEAK BUTTON Cl |
| | L2135 | HOLD LAMP |
| | L2986 | COMPUTED HOLD |
| | L2983 | BPT HIGH ALARM |
| | L2241 | BPT NOT TRIPPED CO |
| | L2979 | EX. TEMP. CONTROL ACTIVE |
| | L2258 | TEMP. CONTROL MONITOR LAMP |
| | K2984 | BPT DEADBAND |
| | K2983 | BASE/PEAK RAMP RATE |
| | K2982 | BPT PEAK OFFSET |
| | K2981 | BPT RUNBACK DEADBAND |

-continued

INDEX OF VARIABLES FOR DRAWINGS

| | | |
|---|---|---|
| | K2980 | BPT HOLD DEADBAND |
| | K2986 | BPT HIGH ALARM LEVEL |
| | K2967 | BPT TRIP LEVEL |
| | K2962 | BPT/EX. TEMP. NEGATIVE RATE |
| | K2963 | BPT/EX. TEMP. POSITIVE RATE |
| | K2961 | EX. TEMP. MAX. TIME COUNT |
| | K2890 | P2C-BPT LOADING ARRAY |
| | K2880 | P2C-BPT STARTING ARRAY |
| | K2940 | BPT RUNBACK CONTROL ARRAY |
| | K2930 | BPT HOLD CONTROL ARRAY |
| | K2985 | BPT REF BIAS |
| | K2996 | MAX EX. TEMP RAMP |
| | 8000 | INLET GUIDE VANE CONTROL |

FIG. 7C

| | | |
|---|---|---|
| | V2017 | BLADE PATH T. GROUP1 AVG. |
| | V2018 | BLADE PATH T. GROUP2 AVG. |
| | V2019 | BLADE PATH T. GROUP3 AVG. |
| | V2080 | COMP. DISCH. PRESS. P2C |
| | V2999 | BPT CONTROL SIGNAL |
| | V2998 | BPT RUNBACK SIGNAL |
| | V2997 | BPT HOLD SIGNAL |
| | V2996 | P2C LOAD-CHARACTERIZED BPT |
| | V2995 | BASE/PEAK BPT BIAS RAMP |
| | V2986 | BPT RUNBACK LIMIT |
| | V2985 | BPT HOLD LIMIT |
| | V2994 | P2C SPEED-CHARACTERIZED BPT |
| | V2970 | DELAYED BPT-HOLD CONTROLLER |
| | V2971 | DELAYED BPT-RUNBACK CONTROLLER |
| | V2981 | EX. TEMP. CONTROL SIGNAL |
| | V2956 | EX. TEMP. TIMER |
| | V2957 | EX. TEMP. RAMP |
| | V2958 | EX. TEMP. RAMP. RATE |
| | V2977 | BPT BIASED REF |
| | L2991 | BPT OR P2C UNRELIABLE |
| | L2990 | BPT RUNBACK |
| | L2994 | BREAKER FLIPFLOP |
| | L2014 | BASE BUTTON Cl |
| | L2015 | PEAK BUTTON Cl |
| | L2935 | HOLD LAMP |
| | L2986 | COMPUTED HOLD |
| | L2983 | BPT HIGH ALARM |
| | L2241 | BPT NOT TRIPPED CO |
| | L2979 | EX. TEMP. CONTROL ACTIVE |
| | L2258 | TEMP. CONTROL MONITOR LAMP |
| | K2984 | BPT DEADBAND |
| | K2983 | BASE/PEAK RAMP RATE |
| | K2982 | BPT PEAK OFFSET |
| | K2981 | BPT RUNBACK DEADBAND |
| | K2980 | BPT HOLD DEADBAND |
| | K2986 | BPT HIGH ALARM LEVEL |
| | K2967 | BPT TRIP LEVEL |
| | K2962 | BPT/EX. TEMP. NEGATIVE RATE |
| | K2963 | BPT/EX. TEMP. POSITIVE RATE |
| | K2961 | EX. TEMP. MAX. TIME COUNT |
| | K2890 | P2C-BPT LOADING ARRAY |
| | K2880 | P2C-BPT STARTING ARRAY |
| | K2940 | BPT RUNBACK CONTROL ARRAY |
| | K2930 | BPT HOLD CONTROL ARRAY |
| | K2985 | BPT REF BIAS |
| | K2996 | MAX EX. TEMP. RAMP |
| | 8000 | INLET GUIDE VANE CONTROL |

FIG. 7D1

| | | |
|---|---|---|
| | V2021 | EXHAUST T. LT09 |
| | V2022 | EXHAUST T. LT10 |
| | V2023 | EXHAUST T. LT11 |
| | V2024 | EXHAUST T. LT12 |
| | V2025 | EXHAUST T. LT13 |
| | V2026 | EXHAUST T. LT14 |
| | V2027 | EXHAUST T. LT15 |
| | V2028 | EXHAUST T. LT16 |
| | V2029 | EXHAUST T. LT41 |
| | V2030 | EXHAUST T. LT42 |
| | V2031 | EXHAUST T. LT43 |
| | V2032 | EXHAUST T. LT44 |
| | V2033 | EXHAUST T. LT45 |
| | V2034 | EXHAUST T. LT46 |
| | V2035 | EXHAUST T. LT47 |
| | V2036 | EXHAUST T. LT48 |
| | V2961 | EX. TEMP. CONTROL SIGNAL |
| | V2958 | EX. TEMP. TIMER |
| | V2985 | BPT HOLD LIMIT |
| | L2994 | BREAKER FLIPFLOP |
| | L2979 | EX. TEMP. CONTROL ACTIVE |
| | L2978 | EX. TEMP. UNRELIABLE |
| | K2971 | (BP-EXH) TEMP. DEADBAND |

FIG. 7D2

| | | |
|---|---|---|
| | V2021 | EXHAUST T. LT09 |
| | V2022 | EXHAUST T. LT10 |
| | V2023 | EXHAUST T. LT11 |
| | V2024 | EXHAUST T. LT12 |

INDEX OF VARIABLES FOR DRAWINGS

| | | |
|---|---|---|
| V2025 | EXHAUST T. LT13 | |
| V2026 | EXHAUST T. LT14 | |
| V2027 | EXHAUST T. LT15 | |
| V2028 | EXHAUST T. LT16 | |
| V2029 | EXHAUST T. LT41 | |
| V2030 | EXHAUST T. LT42 | |
| V2031 | EXHAUST T. LT43 | |
| V2032 | EXHAUST T. LT44 | |
| V2033 | EXHAUST T. LT45 | |
| V2034 | EXHAUST T. LT46 | |
| V2035 | EXHAUST T. LT47 | |
| V2036 | EXHAUST T. LT48 | |
| V2961 | EX. TEMP. CONTROL SIGNAL | |
| V2956 | EX. TEMP. TIMER | |
| V2985 | BPT HOLD LIMIT | |
| L2994 | BREAKER FLIPFLOP | |
| L2979 | EX. TEMP. CONTROLLER ACTIVE | |
| L2978 | EX. TEMP. UNRELIABLE | |
| K2971 | (BP-EXH) TEMP. DEADBAND | |
| V2992 | REFERENCE | |
| V2990 | MW CONTROLLER TOTAL OUTPUT | |
| V2974 | SPEED FUEL REFERENCE | |
| V2104 | GENERATOR MW | |
| V2973 | LOAD FUEL REFERENCE | |
| V2976 | FUEL VALVE SET POINT | |
| V2988 | MW CONTROLLER LAST INPUT | |
| V2989 | MW CONTROLLER INTEGRAL OUTPUT | |
| V2065 | SPEED CONTROLLER OUTPUT | |
| V2064 | SURGE CONTROLLER OUTPUT | |
| V2987 | SELECTED SPEED | |
| V2955 | SPEED CONTROLLER TOTAL OUTPUT | |
| V2954 | SPEED CONTROLLER INTEGRAL OUTPUT | |
| V2953 | SPEED CONTROLLER LAST INPUT | |
| L2994 | BREAKER FLIPFLOP | |
| L2996 | MW FLIPFLOP | |
| L2992 | SURGE/SPEED RUNBACK | |
| L2996 | COMPUTED HOLD | |
| L2135 | HOLD LAMP | |
| L6010 | MIN LOAD LAMP | |
| L6011 | BASE LAMP | |
| L6012 | PEAK LAMP | |
| L2977 | ANALOG SURGE/SPEED UNRELIABLE | |
| K2988 | OUTPUT RANGING GAIN-SPEED | |
| K2987 | OUTPUT RANGING GAIN-LOAD | |
| K2950 | MW CONTROLLER ARRAY | |
| K2990 | SURGE/SPEED RUNBACK DEADBAND | |
| K2991 | MINIMUM LOAD | |
| K2920 | SPEED CONTROLLER ARRAY | |
| K2964 | BASE MW | |
| K2997 | INITIAL FUEL VALVE POSITION | |
| 8002 | READY/OUTPUT | |

FIG. 7G2

| | | |
|---|---|---|
| V2992 | REFERENCE | |
| V2990 | MW CONTROLLER TOTAL OUTPUT | |
| V2974 | SPEED FUEL REFERENCE | |
| V2104 | GENERATOR MW | |
| V2973 | LOAD FUEL REFERENCE | |
| V2976 | FUEL VALVE SET POINT | |
| V2988 | MW CONTROLLER LAST INPUT | |
| V2989 | MW CONTROLLER INTEGRAL OUTPUT | |
| V2065 | SPEED CONTROLLER OUTPUT | |
| V2064 | SURGE CONTROLLER OUTPUT | |
| V2987 | SELECTED SPEED | |
| V2955 | SPEED CONTROLLER TOTAL OUTPUT | |
| V2954 | SPEED CONTROLLER INTEGRAL OUTPUT | |
| V2953 | SPEED CONTROLLER LAST INPUT | |
| L2994 | BREAKER FLIPFLOP | |
| L2996 | MW FLIPFLOP | |
| L2992 | SURGE/SPEED RUNBACK | |
| L2986 | COMPUTED HOLD | |
| L2135 | HOLD LAMP | |
| L6010 | MIN LOAD LAMP | |
| L6011 | BASE LAMP | |
| L6012 | PEAK LAMP | |
| L2977 | ANALOG SURGE/SPEED UNRELIABLE | |
| K2988 | OUTPUT RANGING GAIN-SPEED | |
| K2987 | OUTPUT RANGING GAIN-LOAD | |
| K2950 | MW CONTROLLER ARRAY | |
| K2990 | SURGE/SPEED RUNBACK DEADBAND | |
| K2991 | MINIMUM LOAD | |
| K2920 | SPEED CONTROLLER ARRAY | |
| K2964 | BASE MW | |
| K2997 | INITIAL FUEL VALVE POSITION | |
| 8002 | READY/OUTPUT | |

FIG. 7H1

| | | |
|---|---|---|
| V2994 | OPERATOR LOAD RATE | |
| V2993 | OPERATOR LOAD DEMAND | |
| V2992 | REFERENCE | |
| V2983 | DEMAND | |
| V2982 | RATE | |
| V2979 | COORDINATED DEMAND | |
| V2978 | COORDINATED RATE | |
| V2963 | FUEL VALVE NHC CARD POSITION | |
| V2952 | ACCELERATION TIME | |
| L2994 | BREAKER FLIPFLOP | |
| L3970 | AUTO SYNC RAISE | |
| L3969 | AUTO SYNC LOWER | |
| L2976 | MANUAL FUEL VALVE | |
| L2971 | AUTO SYNC MODE | |
| L2121 | COORD LAMP | |
| L2136 | GO LAMP | |
| L2135 | HOLD LAMP | |
| L2985 | COMPUTED GO/HOLD RESET | |
| L2992 | SURGE/SPEED RUNBACK | |
| L2990 | BPT RUNBACK | |
| L2130 | TEMP CONTROL BUTTON/LAMP | |
| L5056 | TEMP CHANGE ABOVE 7.5 Cl | |
| L2967 | AUTO START | |
| L2968 | AUTO STOP | |
| L2261 | OPEN MAIN GEN. BREAKER CO | |
| L6093 | NORMAL STOP LAMP | |
| K2994 | MAXIMUM LOAD RATE | |
| K2995 | SURGE/SPEED LOAD RUNBACK RATE | |
| K2975 | BPT LOAD RUNBACK RATE | |
| K2973 | SURGE/SPEED SPEED RUNBACK RATE | |
| K2972 | BPT SPEED RUNBACK RATE | |
| K2991 | MINIMUM LOAD | |
| K2979 | MANUAL SYNC ACC RATE | |
| K2850 | ACCELERATION CURVE ARRAY | |
| 8003 | TRACK MANUAL | |
| 8004 | SPEED/LOAD CONTROL | |

FIG. 7H2

| | | |
|---|---|---|
| V2994 | OPERATOR LOAD RATE | |
| V2993 | OPERATOR LOAD DEMAND | |
| V2992 | REFERENCE | |
| V2983 | DEMAND | |
| V2982 | RATE | |
| V2979 | COORDINATED DEMAND | |
| V2978 | COORDINATED RATE | |
| V2963 | FUEL VALVE NHC CARD POSITION | |
| V2952 | ACCELERATION TIME | |
| L2994 | BREAKER FLIPFLOP | |
| L3970 | AUTO SYNC RAISE | |
| L3969 | AUTO SYNC LOWER | |
| L2976 | MANUAL FUEL VALVE | |
| L2971 | AUTO SYNC MODE | |
| L2121 | COORD LAMP | |
| L2136 | GO LAMP | |
| L2135 | HOLD LAMP | |
| L2985 | COMPUTED GO/HOLD RESET | |
| L2992 | SURGE/SPEED RUNBACK | |
| L2990 | BPT RUNBACK | |
| L2130 | TEMP. CONTROL BUTTON/LAMP | |
| L5056 | TEMP. CHANGE ABOVE 7.5 Cl | |
| L2967 | AUTO START | |
| L2968 | AUTO STOP | |
| L2261 | OPEN MAIN GEN. BREAKER CO | |
| L6093 | NORMAL STOP LAMP | |
| K2994 | MAXIMUM LOAD RATE | |
| K2995 | SURGE/SPEED LOAD RUNBACK RATE | |
| K2975 | BPT LOAD RUNBACK RATE | |
| K2973 | SURGE/SPEED SPEED RUNBACK RATE | |
| K2972 | BPT SPEED RUNBACK RATE | |
| K2991 | MINIMUM LOAD | |
| K2979 | MANUAL SYNC ACC RATE | |
| K2850 | ACCELERATION CURVE ARRAY | |
| 8003 | TRACK MANUAL | |
| 8004 | SPEED/LOAD CONTROL | |

FIG. 8A2

| | | |
|---|---|---|
| V2993 | OPERATOR LOAD DEMAND | |
| L2976 | MANUAL FUEL VALVE | |
| L2121 | COORD LAMP | |
| L2994 | BREAKER FLIPFLOP | |
| L2129 | MW CONTROL BUTTON/LAMP | |
| L2985 | COMPUTED GO/HOLD RESET | |
| L2986 | COMPUTED HOLD | |
| L2015 | PEAK BUTTON Cl | |
| L2125 | MIN LOAD LAMP | |
| L2980 | MIN LOAD BUTTON PUSHED | |
| K2965 | PEAK MW | |
| K2964 | BASE MW | |

FIG. 8B2

| | | |
|---|---|---|
| L2992 | SURGE/SPEED RUNBACK | |
| L2990 | BPT RUNBACK | |
| L2994 | BREAKER FLIPFLOP | |
| 800C | FLAME LOGIC | |
| 800A | AUTO SYNC LOGIC | |

FIG. 8C

| | | |
|---|---|---|
| L2129 | MW CONTROL BUTTON/LAMP | |
| L2130 | TEMP CONTROL BUTTON/LAMP | |

-continued

INDEX OF VARIABLES FOR DRAWINGS

Figure 8D:
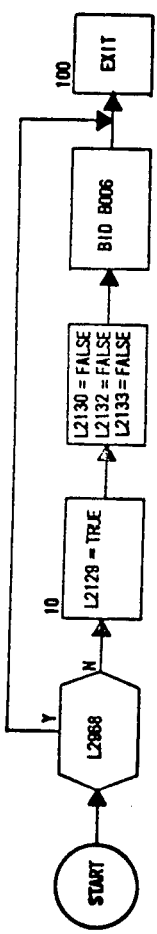
Figure 8E:
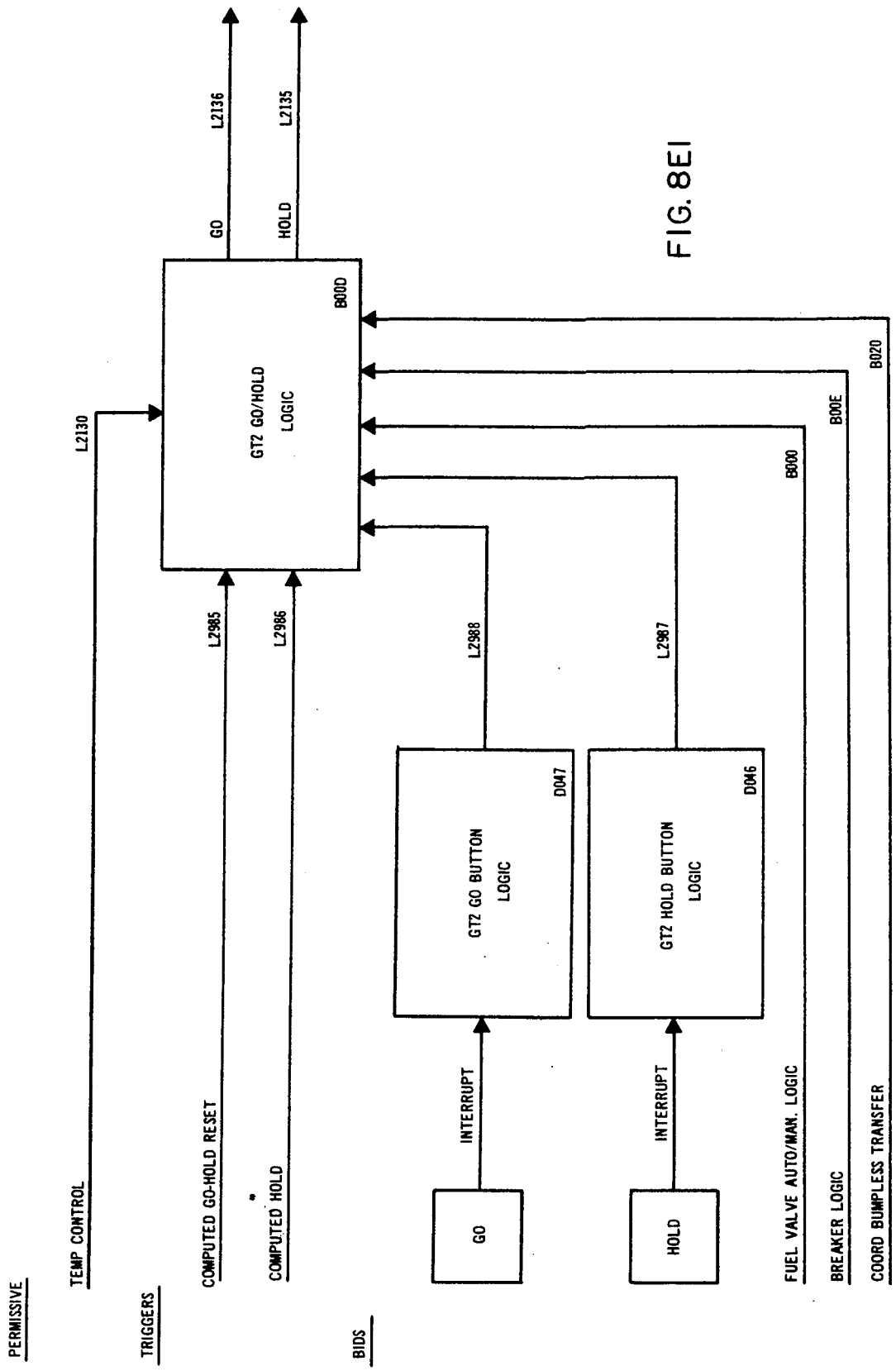

|  |  |  |
|---|---|---|
|  | L2132 | BASE LIMIT |
|  | L2133 | PEAK LIMIT |
|  | B006 | MW/TEMP CONTROL BUMPLESS TRANSFER |
| FIG. 8D |  |  |
|  | L2129 | MW CONTROL BUTTON/LAMP |
|  | L2130 | TEMP CONTROL BUTTON/LAMP |
|  | L2132 | BASE LIMIT |
|  | L2133 | PEAK LIMIT |
|  | L2968 | AUTO STOP |
|  | B006 | MW/TEMP CONTROL BUMPLESS TRANSFER |
| FIG. 8E2 |  |  |
|  | L2988 | GO BUTTON PUSHED |
|  | L2987 | HOLD BUTTON PUSHED |
|  | L2986 | COMPUTED HOLD |
|  | L2985 | COMPUTED GO-HOLD RESET |
|  | L2136 | GO LAMP |
|  | L2135 | HOLD LAMP |
|  | L2976 | MANUAL FUEL VALVE |
|  | L2994 | BREAKER FLIPFLOP |
|  | L2121 | COORD LAMP |
|  | L2130 | TEMP CONTROL BUTTON/LAMP |
| FIG. 8F2 |  |  |
|  | V2993 | OPERATOR LOAD DEMAND |
|  | L2121 | COORD LAMP |
|  | L2976 | MANUAL FUEL VALVE |
|  | L2994 | BREAKER FLIPFLOP |
|  | L2129 | MW CONTROL BUTTON/LAMP |
|  | L2014 | BASE BUTTON C1 |
|  | L2015 | PEAK BUTTON C1 |
|  | K2964 | BASE MW |
|  | K2965 | PEAK MW |

What is claimed is:

1. A gas turbine electric power plant comprising a compressor section and a turbine section, a plurality of combustors for energizing the driving gas flow for the turbine section, means for generating electric power under the driving power of the turbine, a gas turbine control system including means for controlling the flow of fuel to said turbine combustors, means for generating a fuel reference as an input to said fuel controlling means during speed and load modes of operation, means for generating a combustor shell pressure representation, means for generating a blade path temperature representation, means for generating an exhaust path temperature representation, means for generating a blade path temperature reference as a function of the combustor shell pressure and exhaust temperature representations, and means for limiting the fuel reference input to limit the turbine blade path temperature in accordance with the outputs of said blade path temperature representation and reference generating means.

2. A gas turbine power plant as set forth in claim 1 wherein said blade path temperature reference generating means generates the blade path temperature reference in accordance with a stored temperature limit characteristic during startup and in accordance with a stored temperature limit characteristic and a predetermined function of the exhaust temperature representation during load operation.

3. A gas turbine power plant as set forth in claim 2 wherein means are provided for generating an exhaust temperature limit reference in accordance with a stored temperature limit characteristic, means are provided for generating an output representing the difference between the exhaust temperature representation and the exhaust temperature limit reference, and said blade path temperature reference generating means responds to the exhaust temperature difference output.

4. A gas turbine power plant as set forth in claim 2 wherein said fuel reference generating means includes a ramp generator and said fuel reference limiting means includes means for holding or cutting back the output of said reference generator means in accordance with the output of said blade path temperature reference generating means.

5. A gas turbine power plant as set forth in claim 2 wherein means are provided for incrementing the blade path temperature limit reference upwardly until the exhaust temperature reaches an exhaust temperature limit value.

6. A gas turbine power plant as set forth in claim 5 wherein the incrementation occurs along a temperature ramp at a rate which is substantially matched with the response time of the exhaust temperature representation generating means.

7. A gas turbine power plant as set forth in claim 5 wherein means are provided for incrementing the blade path temperature reference for a limited time period and then for holding the blade path temperature reference constant for a succeeding time period, and means are provided resuming the blade path temperature reference incrementation if the actual exhaust temperature is still below the limit exhaust temperature value.

8. A gas turbine power plant as set forth in claim 3 wherein the blade path temperature characteristic corresponds to a characteristic substantially equal to the exhaust temperature characteristic minus a predetermined temperature value.

9. A gas turbine power plant as set forth in claim 3 wherein said exhaust temperature difference generating means generates an output difference when the exhaust temperature and the exhaust temperature limit reference differ by less than a predetermined amount.

10. A gas turbine power plant as set forth in claim 8 wherein said exhaust temperature difference generating means generates an output difference when the exhaust temperature and the exhaust temperature limit reference differ by less than a predetermined amount.

11. A gas turbine power plant as set forth in claim 9 wherein said blade path temperature reference generating means stops the blade path temperature reference incrementation when the exhaust temperature equals the exhaust temperature limit reference.

12. A gas turbine electric power plant as set forth in claim 4 wherein a digital computer is provided as part of said control system and it includes said blade path temperature reference generating means and said ramp generator and said holding or cutting back means.

13. A gas turbine power plant as set forth in claim 12 wherein said digital computer includes means for generating an exhaust temperature limit reference in accordance with a stored temperature limit characteristic, and means for generating an output representing the difference between the exhaust temperature representation and the exhaust temperature limit reference, and said blade path temperature reference generating means responds to the exhaust temperature difference output.

14. A gas turbine power plant as set forth in claim 13 wherein said digital computer includes means for incrementing the blade path temperature limit reference upwardly until the exhaust temperature reaches an exhaust temperature limit value.

15. A gas turbine power plant as set forth in claim 14 wherein said exhaust temperature difference generating means generates an output difference when the exhaust temperature and exhaust temperature limit reference differ by less than a predetermined amount.

16. A control system for an electric power plant gas turbine comprising means for controlling the flow of fuel to said gas turbine, means for generating a fuel reference as an input to said fuel controlling means during speed and load modes of operation, means for generating a combustor shell pressure representation, means for generating a blade path temperature representation, means for generating an exhaust path temperature representation, means for generating a blade path temperature reference as a function of the combustor shell pressure and exhaust temperature representations, and means for limiting the fuel reference input to limit the turbine blade path temperature in accordance with the outputs of said blade path temperature representation and reference generating means.

17. A gas turbine control system as set forth in claim 16 wherein said blade path temperature reference generating means generates the blade path temperature reference in accordance with a stored temperature limit characteristic during startup and in accordance with a stored temperature limit characteristic and a predetermined function of the exhaust temperature representation during load operation.

18. A gas turbine control system as set forth in claim 17 wherein means are provided for generating an exhaust temperature limit reference in accordance with a stored temperature limit characteristic, means are provided for generating an output representing the difference between the exhaust temperature representation and the exhaust temperature limit reference, and said blade path temperature reference generating means responds to the exhaust temperature difference output.

19. A gas turbine control system as set forth in claim 17 wherein said fuel reference generating means includes means for holding or cutting back the output of said reference generator means in accordance with the output of said blade path temperature reference generating means.

20. A gas turbine control system as set forth in claim 17 wherein means are provided for incrementing the blade path temperature limit reference upwardly until the exhaust temperature reaches an exhaust temperature limit value.

21. A gas turbine control system as set forth in claim 20 wherein means are provided for incrementing the blade path temperature reference for a limited time period and then for holding the blade path temperature reference constant for a succeeding time period, and means are provided resuming the blade path temperature reference incrementation if the actual exhaust temperature is still below the limit exhaust temperature value.

22. A gas turbine control system as set forth in claim 18 wherein said exhaust temperature difference generating means generates an output difference when the exhaust temperature and the exhaust temperature limit reference differ by less than a predetermined amount.

23. A gas turbine control system as set forth in claim 19 wherein a digital computer is provided as part of said control system and it includes said blade path temperature reference generating means and said ramp generator and said holding or cutting back means.

24. A gas turbine control system as set forth in claim 23 wherein said digital computer includes means for generating an exhaust temperature limit reference in accordance with a stored temperature limit characteristic, and means for generating an output representing the difference between the exhaust temperature representation and the exhaust temperature limit reference, and said blade path temperature difference output.

25. A gas turbine control system as set forth in claim 24 wherein said digital computer includes means for incrementing the blade path temperature limit reference upwardly until the exhaust temperature reaches an exhaust temperature limit value.

26. A gas turbine control system as set forth in claim 25 wherein said exhaust temperature difference generating means generates an output difference when the exhaust temperature and exhaust temperature limit reference differ by less than a predetermined amount.

27. A combined cycle electric power plant comprising at least one gas turbine, means for generating steam in response to heat energy from said gas turbine, a steam turbine driven by steam supplied to it from said steam generating means, means for generating electric power under the driving power of said turbines, means for controlling the operation of said turbine and said steam generating means, said controlling means including a gas turbine control system including means for controlling the flow of fuel to said gas turbines, means for generating a fuel reference as an input to said fuel controlling means during speed and load modes of operation, means for generating a combustor shell pressure representation, means for generating a blade path temperature representation, means for generating an exhaust path temperature representation, means for generating a blade path temperature reference as a function of the combustor shell pressure and exhaust temperature representations, and means for limiting the fuel reference input to limit the turbine blade path temperature in accordance with the outputs of said blade path temperature representation and reference generating means.

28. A combined cycle electric power plant as set forth in claim 27 wherein means are provided for generating an exhaust temperature limit reference in accordance with a stored temperature limit characteristic, means are provided for generating an output representing the difference between the exhaust temperature representation and the exhaust temperature limit reference, and said blade path temperature reference generating means respond to the exhaust temperature difference output.

29. A combined cycle electric power plant as set forth in claim 27 wherein said fuel reference generating means includes a ramp generator and said fuel reference limiting means includes means for holding or cutting back the output of said reference generator means in accordance with the output of said blade path temperature reference generating means.

30. A combined cycle electric power plant as set forth in claim 27 wherein means are provided for incrementing the blade path temperature limit reference upwardly until the exhaust temperature reaches an exhaust temperature limit value.

31. A combined cycle electric power plant as set forth in claim 30 wherein means are provided for incrementing the blade path temperature reference for a limited period and then for holding the blade path temperature reference constant for a succeeding time period, and means are provided resuming the blade path temperature reference incrementation if the actual exhaust temperature is still below the limit exhaust temperature value.

32. A combined cycle electric power plant as set forth in claim 28 wherein means are provided for generating an exhaust temperature limit reference in accordance with a stored temperature limit characteristic, means are provided for generating an output representing the difference between the exhaust temperature representation and the exhaust temperature limit reference, and said blade path temperature reference generating means responds to the exhaust temperature difference output.

33. A combined cycle electric power plant as set forth in claim 29 wherein a digital computer is provided as part of said control system and it includes said blade path temperature reference generating means and said ramp generator and said holding or cutting back means.

34. A combined cycle electric power plant as set forth in claim 33 wherein said fuel reference generating meeans includes a ramp generator and said fuel reference limiting means includes means for holding or cutting back the output of said reference generator means in accordance with the output of said blade path temperature reference generating means, means are provided for incrementing the blade path temperature limit reference upwardly until the exhaust temperature reaches an exhaust temperature limit value.

* * * * *